US012725736B2

(12) United States Patent
Tan et al.

(10) Patent No.: US 12,725,736 B2
(45) Date of Patent: Sep. 1, 2026

(54) LEAD ZIRCONATE-BASED ANTIFERROELECTRIC CERAMICS WITH IMPROVED ENERGY EFFICIENCY AND METHOD OF MAKING SAME

(71) Applicant: Iowa State University Research Foundation, Inc., Ames, IA (US)

(72) Inventors: Xiaoli Tan, Ames, IA (US); Anand Prakash Singh Gaur, Ames, IA (US); Jun Cui, Ames, IA (US); Binzhi Liu, Columbus, OH (US); Duane D. Johnson, Ames, IA (US); Renu, Ballwin, MI (US)

(73) Assignee: Iowa State University Research Foundation, Inc., Ames, IA (US)

( * ) Notice: Subject to any disclaimer, the term of this patent is extended or adjusted under 35 U.S.C. 154(b) by 0 days.

(21) Appl. No.: 18/962,019

(22) Filed: Nov. 27, 2024

(65) Prior Publication Data

US 2025/0174401 A1 May 29, 2025

Related U.S. Application Data

(60) Provisional application No. 63/602,968, filed on Nov. 27, 2023.

(51) Int. Cl.
*H01G 4/12* (2006.01)
*C01G 25/00* (2006.01)

(52) U.S. Cl.
CPC ......... *H01G 4/1236* (2013.01); *C01G 25/006* (2013.01); *C01P 2002/52* (2013.01); *C01P 2002/72* (2013.01); *C01P 2006/40* (2013.01)

(58) Field of Classification Search
CPC .................................................... H01G 4/1245
See application file for complete search history.

(56) References Cited

U.S. PATENT DOCUMENTS

2016/0340258 A1* 11/2016 Engel ....................... H01G 4/30

FOREIGN PATENT DOCUMENTS

CN 103641477 A * 3/2014 ........... C04B 35/493
CN 111470863 A * 7/2020 ........... C04B 35/493

OTHER PUBLICATIONS

Wang et al., "Ultrahigh energy storage density and efficiency in PLZST antiferroelectric ceramics via multiple optimization strategy", Journal of the European Ceramic Society, 43, Mar. 2023, pp. 4051-4059.*

(Continued)

*Primary Examiner* — Khanh T Nguyen
(74) *Attorney, Agent, or Firm* — Reinhart Boerner Van Deuren P.C.

(57) ABSTRACT

Disclosed are embodiments of an antiferroelectric (AFE) ceramic. The AFE ceramic includes a $PbZrO_3$-based composition. The AFE ceramic has a charge-discharge energy efficiency of at least 96%, and the AFE ceramic has a recoverable energy density of at least 2.8 J/cm$^3$ at a peak field of at least 200 kV/cm. Embodiments of a method of identifying potential AFE ceramic compositions having high energy efficiency and recoverable energy density are also disclosed.

17 Claims, 16 Drawing Sheets
(5 of 16 Drawing Sheet(s) Filed in Color)

(56) References Cited

OTHER PUBLICATIONS

Gaur et al.; Antiferroelectric Ceramics for Energy-Efficient Capacitors by Theory-Guided Discovery; https://doi.org/10.1002/adma.202312856 ; May 22, 2024.
Liu et al.; High-Performance PbZrO3-based antiferroelectric multilayer capacitors based on multiple enhancement strategy; https://doi.org/10.1016/j.cej.2022.136729; Chemical Engineering Journal; vol. 446, Part 2, Oct. 15, 2022, 136729.
Mohapatra et al.; Relaxor antiferroelectric ceramics with ultrahigh efficiency for energy storage applications; https://doi.org/10.1016/j.jeurceramsoc.2019.07.050; Journal of the European Ceramic Society vol. 39, Issue 15, Dec. 2019, pp. 4735-4742.
Chao et al.; Achieving high energy efficiency and energy density in PbHfO3-based antiferroelectric ceramics; https://doi.org/10.1039/DOTC04617E; Journal of Materials Chemistry C 8, 17016-17024 Nov. 5, 2020.
Liu et al.; Antiferroelectric-liner dielectric solid solutions leading to large energy density and ultrahigh efficiency in PBLZST-CZT ceramics; https://doi.org/10.1016/j.ceramint.2022.02.248; Ceramics International vol. 48, Issue 12, Jun. 15, 2022, pp. 16933-16943.
Xu et al.; Energy storage and release properties of Sr-doped (Pb, La)(Zr, Sn, Ti)O3 antiferroelectric ceramics; https://doi.org/10.1016/j.ceramint.2016.05.053; Ceramics International vol. 42, Issue 11, Aug. 15, 2016, pp. 12875-12879.
Huang et al.; Ultralow Electrical Hysteresis along with High Energy-Storage Density in Lead-Based Antiferroelectric Ceramics; https://doi.org/10.1002/aelm.201901366; Feb. 19, 2020.
Zang et al.; Enhanced antiferroelectric-like relaxor ferroelectric characteristic boosting energy storage performance of (Bi0.5Na0.5)TiO3-based ceramics via defect engineering; https://doi.org/10.1016/j.jmat.2022.01.007; Journal of Materiomics vol. 8, Issue 3, May 2022, pp. 527-536.
Liu; Phase transition and materials design of PbZrO3-based antiferroelectric ceramics; 2022.
Gaur et al.; Electric hysteresis of antiferroelectric-ferroelectric phase transition; Electronic Materials and Applications Meeting, Jan. 19, 2023.
Johnson et al.; Theory-guided experimental optimization of high-efficiency ceramic capacitor; known prior to Nov. 27, 2024.
Tan; Atomic structure, phase transitions, and functional properties of antiferroelectric perovskite oxide ceramics; Dec. 5-9, 2022.

* cited by examiner 1.4
1.2
1.0
0.8
0.6
0.4
εr(x10³)
COOLING
HEATING
100
200
300
400
500
600
T (K)

LEAD ZIRCONATE-BASED ANTIFERROELECTRIC CERAMICS WITH IMPROVED ENERGY EFFICIENCY AND METHOD OF MAKING SAME

CROSS-REFERENCE TO RELATED PATENT APPLICATIONS

This patent application claims the benefit of U.S. Provisional Patent Application No. 63/602,968, filed Nov. 27, 2023, the entire teachings and disclosure of which are incorporated herein by reference thereto.

STATEMENT REGARDING FEDERALLY SPONSORED RESEARCH AND DEVELOPMENT

This invention was made with government support under DE-EE0009105 awarded by the Department of Energy. The government has certain rights in the invention.

FIELD OF THE INVENTION

This invention generally relates to electronic ceramics and, in particular, to an antiferroelectric ceramic composition and method of identifying compositions of antiferroelectric ceramics having high energy efficiency.

BACKGROUND OF THE INVENTION

Capacitors are used in virtually all electronic devices and are ubiquitous in everyday life. For instance, every smartphone has approximately 1,000 capacitors and every electric car's inverter needs a DC-link with huge capacitance (about 1 mF). Ceramic capacitors account for ~90% of the market by volume, with more than three trillion multilayer ceramic capacitors manufactured each year. Capacitors with a high energy density are essential in areas like the storage of electricity generated from renewable sources, power electronics in the electric grid and electric cars, and heart defibrillators.

Antiferroelectric (AFE) ceramics (such as $PbZrO_3$-based) stand out from dielectrics for high energy-density capacitors because of the electric field-induced antiferroelectric-ferroelectric (AFE/FE) phase transition. As schematically shown in the polarization (P) vs. electric field (E) diagram in FIG. 9, the AFE phase transforms to the FE phase at the field $E_F$ during charging, storing an amount of energy (per volume) quantified as $$W_{st} = \int_0^{P_{max}} EdP$$

During discharge, the reverse transition occurs at $E_A$ with the recoverable energy (per volume) expressed as $$W_{rec} = \int_{P_r}^{P_{max}} EdP$$

where $P_{max}$ and $P_r$ are polarizations at the peak field and zero field, respectively. The charge-discharge energy efficiency of a dielectric capacitor is assessed according to $\eta = W_{rec}/W_{st}$.

In addition to their high $W_{rec}$ values, AFE capacitors maintain a discharge rate 100× faster than batteries, allowing excellent power delivery. These features make AFE capacitors ideal for systems requiring high frequency (1~100 kHz) power conditioning and fast discharge (<1 μs) pulse power. With the fast growth of clean energy from renewable sources, where power inverters (DC to AC) are critical to connecting electricity to a regional grid, and the projected production of millions of electric cars, where power conditioning is key to energy efficiency, the demand for reliable AFE capacitors is large and urgent.

However, despite their high energy density and powder density, AFE capacitors are barely commercially available. The main limiting factor is the short charge-discharge cycle lifetime ($N_f$, ~1 million cycles) resulting from the large electric hysteresis ΔE of the AFE/FE phase transition. Furthermore, as evident from FIG. 9, a large ΔE corresponds to a low energy efficiency q, which is reported to be in the range of 70~80% in most $PbZrO_3$-based AFE ceramics and below 70% in most Pb-free AFE ceramics. A considerable amount of energy is then converted to heat and wasted. This is detrimental to AFE devices especially for their niche applications at high frequencies.

Therefore, AFE ceramics with minimum ΔE are urgently sought-after as they are expected to have an extended charge-discharge service lifetime. In recent years, the empirical approach with trial-and-error has been employed to identify new $PbZrO_3$-based compositions, and through trial-and-error, $PbZrO_3$-based compositions with $\eta > 90\%$ have been identified. However, a theory that guides the discovery of AFE materials with minimum ΔE and ultrahigh η is lacking.

Microstructurally, the AFE/FE phase transition is accomplished through the motion of the AFE/FE interface. Applicant believes that the incompatible interface nature (unmatched AFE and FE lattices and abruptly terminating polarizations) is the origin of the large ΔE, hence, the mediocre q, and hence, limited $N_f$. Incompatible AFE/FE interfaces possess elastic distortion as well as electrostatic energies, result in low interface-mobility and poor phase transition-reversibility.

BRIEF SUMMARY OF THE INVENTION

Applicant has observed that the AFE/FE phase transition is displacive, resembling the austenite/martensite transition in shape-memory alloys. Over the past two decades, the geometric nonlinear theory has been developed and experimentally validated to drastically improve the reversibility of martensitic transitions in shape-memory alloys. Based on the observed similarity between the AFE/FE phase transition and the austenite-martensite transition, Applicant has applied the geometric nonlinear theory of martensitic transition to the AFE/FE phase transition in $PbZrO_3$-based oxides, and using this approach, Applicant has successfully developed an AFE ceramic composition that achieves a charge-discharge energy efficiency of 98.2%, which, to Applicant's knowledge, is the highest known charge-discharge energy efficiency reported for AFE ceramics.

According to a first aspect, embodiments of the disclosure relate to an antiferroelectric (AFE) ceramic. The AFE ceramic is a $PbZrO_3$-based composition. The AFE ceramic has a charge-discharge energy efficiency of at least 96%, and the AFE ceramic has a recoverable energy density of at least 2.8 $J/cm^3$ at a peak field of at least 200 kV/cm.

A second aspect relates to the AFE ceramic of the first aspect in which the $PbZrO_3$-based composition has the formula of $[Pb_{(1-x-y-1.5z)}>Sr_xBa_yLa_z][Zr_{(1-u-v)}\ Sn_uTi_v]O_3$ A third aspect relates to the AFE ceramic of the second aspect in which x is in a range from 0.02 to 0.06.

A fourth aspect relates to the AFE ceramic of the second aspect or the third aspect in which y is in a range from 0.02 to 0.06.

A fifth aspect relates to the AFE ceramic of any of the second aspect through the fourth aspect in which z is in a range from 0.02 to 0.03.

A sixth aspect relates to the AFE ceramic of any of the second aspect through the fifth aspect in which u is in a range from 0.20 to 0.45.

A seventh aspect relates to the AFE ceramic of any of the second aspect through the sixth aspect in which v is in a range from 0.04 to 0.10.

An eighth aspect relates to the AFE ceramic of any of the second aspect through the seventh aspect in which the formula of the $PbZrO_3$-based composition is $(Pb_{0.87}Sr_{0.05}Ba_{0.05}La_{0.02})(Zr_{0.53}Sn_{0.40}Ti_{0.07})O_3$.

A ninth aspect relates to the AFE ceramic of any of the second aspect through the seventh aspect in which the formula of the $PbZrO_3$-based composition is $(Pb_{0.87}Sr_{0.05}Ba_{0.05}La_{0.02})(Zr_{0.52}Sn_{0.40}Ti_{0.08})O_3$.

A tenth aspect relates to the AFE ceramic of the eighth aspect or the ninth aspect in which the charge-discharge energy efficiency is at least 98%.

An eleventh aspect relates to the AFE ceramic of any of the second aspect through the seventh aspect in which the formula of the $PbZrO_3$-based composition is $(Pb_{0.87}Sr_{0.05}Ba_{0.05}La_{0.02})(Zr_{0.51}Sn_{0.41}Ti_{0.08})O_3$.

A twelfth aspect relates to the AFE ceramic of any of the ninth aspect to the eleventh aspect in which the recoverable energy density is at least 3.0 $J/cm^3$.

A thirteenth aspect relates to the AFE ceramic of the third aspect in which the formula of the $PbZrO_3$-based composition is $(Pb_{0.87}Sr_{0.05}Ba_{0.05}La_{0.02})(Zr_{0.52}Sn_{0.41}Ti_{0.07})O_3$.

A fourteenth aspect relates to the AFE ceramic of any of the first aspect to the thirteenth aspect in which the AFE ceramic exhibits a reduction in maximum polarization of 6% or less after $7.95\times10^7$ charge-discharge cycles.

According to a fifteenth aspect, embodiments of the disclosure relate to a method of synthesizing antiferroelectric (AFE) ceramics having a charge-discharge energy efficiency of at least 96%. In the method, density functional theory calculations are conducted on AFE base compositions to identify at least one potential composition based on mismatch strains between AFE phases and ferroelectric (FE), a FE cell angle, and AFE phase stability. A plurality of samples having compositions that vary by at least 0.1 at % and no more than 3.0 at % of at least one element relative to the at least one potential composition are prepared. The recoverable energy density and charge-discharge efficiency of the plurality of samples are measured. Compositions for which the charge-discharge efficiency is at least 96% and the recoverable energy density is at least 2.8 $J/cm^3$ at a peak field of at least 200 kV/cm are selected, and the selected compositions are synthesized using solid-state reactions.

A sixteenth aspect relates to the method of the fifteenth aspect in which the plurality of samples are prepared by preparing powder mixtures using a multi-channel auto-powder dispenser, mixing and milling the powder mixtures in a multi-channel milling machine, drying the powder in a vacuum oven, pressing the powder into pellets, calcining the pellets, grinding the pellets back into a powder, re-mixing the powder, re-drying the powder in the vacuum oven, re-pressing the powder back into pellets, and sintering the pellets.

A seventeenth aspect relates to the method of the sixteenth aspect in which the AFE base composition is $PbZrO_3$.

An eighteenth aspect relates to the method of the eighteenth aspect in which preparing powder mixtures further involves adding 4 wt % excess PbO.

A nineteenth aspect relates to the method of the eighteenth aspect or the nineteenth aspect in which the pellets are sintered at 1350° C. for 3 hours.

Other aspects, objectives and advantages of the invention will become more apparent from the following detailed description when taken in conjunction with the accompanying drawings.

BRIEF DESCRIPTION OF THE DRAWINGS

The patent or application file contains at least one drawing executed in color. Copies of this patent or patent application publication with color drawings will be provided by the Office upon request and payment of the necessary fee.

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

The disclosed $PbZrO_3$-based AFE ceramic compositions with near-perfect energy efficiencies were developed through Applicant's use of the geometric nonlinear theory as a guide for synthesizing new AFE ceramic compositions. As will be discussed more fully below, the near-perfect energy efficiency AFE ceramic compositions have a formula of $[Pb_{(1-x-y-1.5z)}Sr_xBa_yLa_z][Zr_{(1-u-v)}Sn_uTi_v]O_3$ in which x is in a range from 0.02 to 0.06, y is in a range from 0.02 to 0.06, z is in a range from 0.02 to 0.03, u is in a range from 0.20 to 0.45, and v is in a range from 0.04 to 0.10. Specific compositions demonstrated to have a near-perfect energy efficiency and a recoverable energy density of about 3 J/cm$^3$ are provided in the Table below.

| Composition | Peak field (kV/cm) | $P_m$ (μC/cm$^2$) | $W_{rec}$ (J/cm$^2$) | Energy Efficiency η (%) |
|---|---|---|---|---|
| $[Pb_{0.87}Sr_{0.05}Ba_{0.05}La_{0.02}][Zr_{0.53}Sn_{0.40}Ti_{0.07}]O_3$ | 210 | 26 | 2.8 | 98.3 |
| $[Pb_{0.87}Sr_{0.05}Ba_{0.05}La_{0.02}][Zr_{0.52}Sn_{0.40}Ti_{0.08}]O_3$ | 220 | 26 | 3.0 | 98.2 |
| $[Pb_{0.87}Sr_{0.05}Ba_{0.05}La_{0.02}][Zr_{0.51}Sn_{0.41}Ti_{0.08}]O_3$ | 220 | 28 | 3.0 | 97.7 |
| $[Pb_{0.865}Sr_{0.03}Ba_{0.06}La_{0.03}][Zr_{0.60}Sn_{0.34}Ti_{0.06}]O_3$ | 200 | 30 | 3.7 | 97.2 |
| $[Pb_{0.875}Sr_{0.03}Ba_{0.05}La_{0.03}][Zr_{0.58}Sn_{0.36}Ti_{0.06}]O_3$ | 200 | 29 | 3.2 | 98.0 |
| $[Pb_{0.865}Sr_{0.03}Ba_{0.06}La_{0.03}][Zr_{0.58}Sn_{0.34}Ti_{0.08}]O_3$ | 180 | 33 | 3.0 | 98.0 |

Figure 1A:
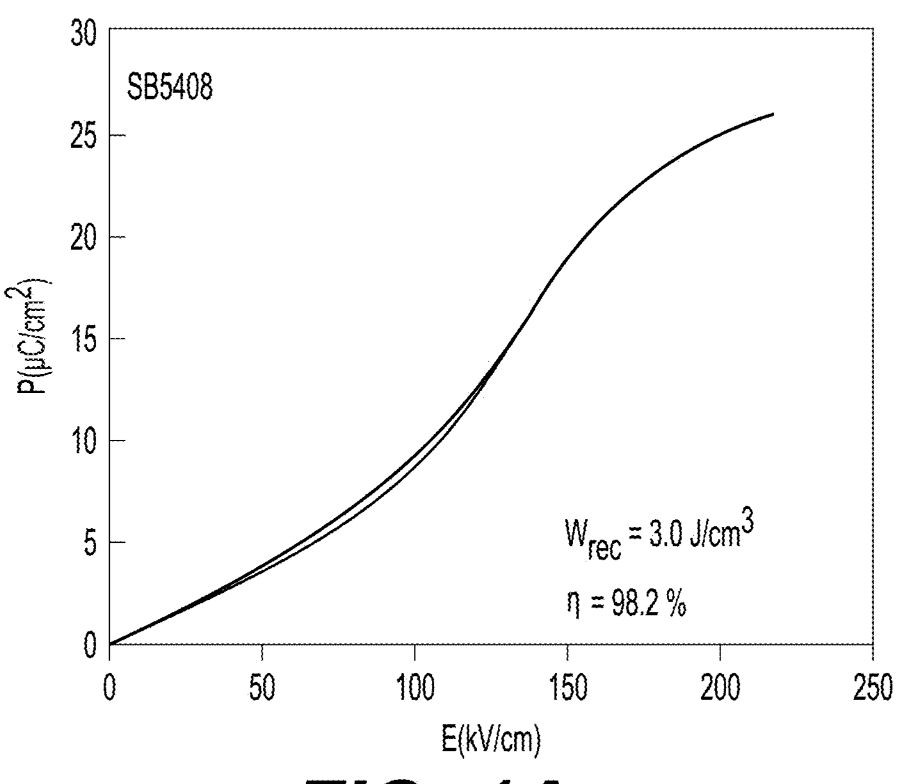
FIG. 1A is a polarization (P) vs. electric field (E) curve measured at room temperature under a unipolar field of 220 kV/cm in an AFE ceramic according to the present disclosure.
Figure 1B:
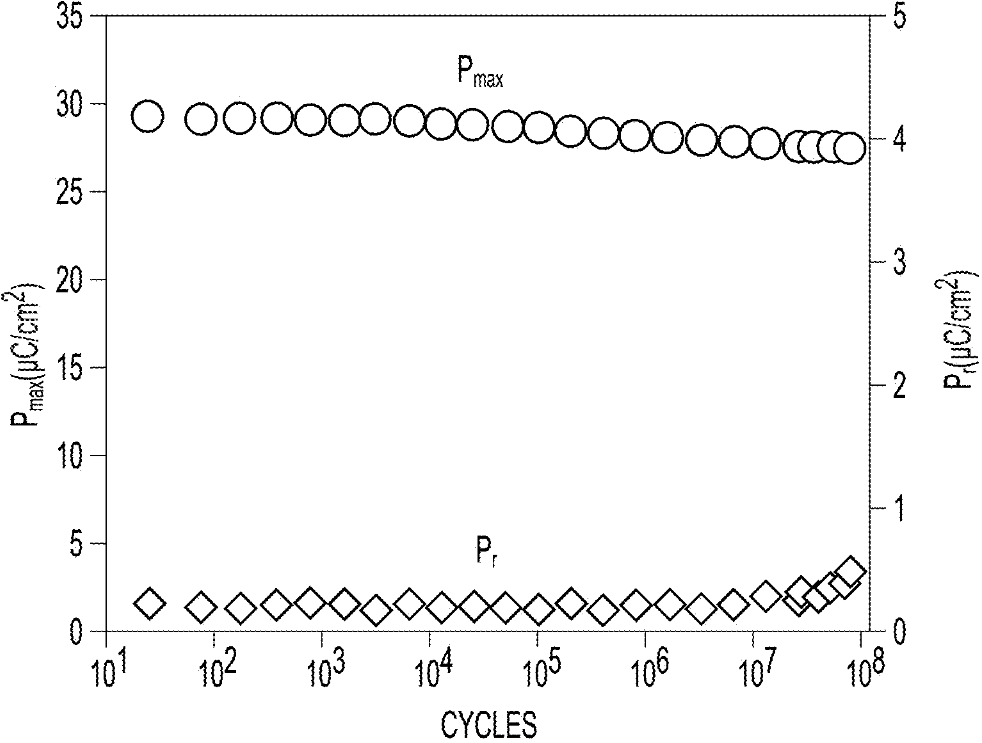
FIG. 1B is a graph of the evolution of $P_{max}$ and $P_r$ during fatigue test.
Figures 1C, 2A:
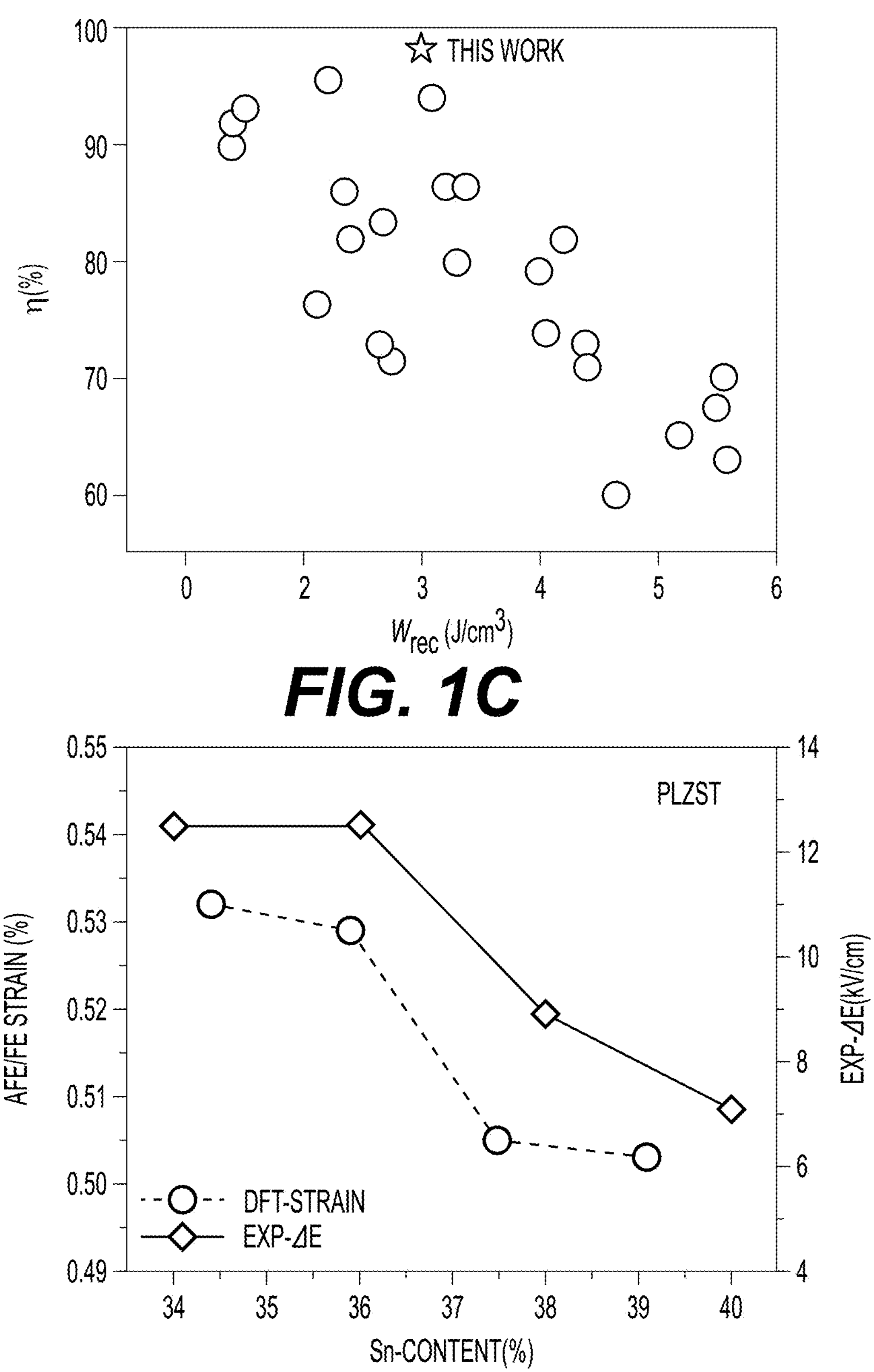
FIG. 1C is a chart comparing the AFE ceramic according to the present disclosure against other AFE ceramics reported in the literature with respect to the properties of charge-discharge energy efficiency q and recoverable energy density $W_{rec}$.
FIGS. 2A-2D provide graphs of the correlation between theoretically calculated AFE/FE mismatch strain and experimentally determined electric hysteresis for AFE ceramic compositions having varying Sn content (FIG. 2A), Ba content (FIG. 2B), Sr content (FIG. 2C), and Ba content (FIG. 2D)

In particular, one of the developed compositions exhibited, to Applicant's understanding, the highest reported energy efficiency of an AFE ceramic of r/=98.2% at $W_{rec}$=3.0 J/cm$^3$ under an applied field of 220 kV/cm. The particular AFE composition exhibiting these properties has the formula of $(Pb_{0.87}Sr_{0.05}Ba_{0.05}La_{0.02})(Zr_{0.52}Sn_{0.40}Ti_{0.08})O_3$, referred to herein as SB5408. FIG. 1A provides the P vs. E curve of this $PbZrO_3$-based AFE ceramic. As can be seen, the P vs. E curve in SB5408 is nearly hysteresis-free, which is a manifestation of its supercompatible and highly mobile AFE/FE interfaces. The highly reversible AFE/FE transition engenders a strong fatigue resistance to the ceramic, surviving a record-long $7.95\times10^7$ charge-discharge cycles with only 5.8% reduction in $P_{max}$ as shown in FIG. 1B. The $P_r$ remains low at 0.4 μC/cm$^2$ after fatigue. Most importantly, q remains almost unchanged (a 1.5% loss) and $W_{rec}$ retains 91.3% of its initial value. Compared against other AFE bulk ceramics reported in the literature, the disclosed AFE ceramic compositions discovered under theory-guidance exhibit the highest energy efficiency (as shown in FIG. 1C) and the longest endurance, particularly promising for high-frequency applications.

As mentioned, the development of these AFE ceramic compositions was guided by the geometric nonlinear theory. Based on previous empirical studies, the (Pb,Sr,Ba,La)(Zr,Sn,Ti)$O_3$ solid solution was used as the model system to which the geometric nonlinear theory was applied.

The geometric nonlinear theory of martensitic transformation specifies conditions: (i) $\det U=\lambda_1\lambda_2\lambda_3=1$, and (ii) $\lambda_2=1$ in order to have a compatible interface between transient phases. Here U is the transformation stretch tensor that maps the martensite lattice to the austenite lattice, detU is its determinant; and $\lambda_1\leq\lambda_2\leq\lambda_3$ are the ordered eigenvalues of U. It has been shown experimentally in shape memory alloys that the second condition, i.e. $\lambda_2=1$, seems to be sufficient for achieving excellent compatibility at the austenite/martensite interface. Thus, in the disclosed high-throughput density functional theory calculations, the focus was on calculating the $\lambda_2$ value for (Pb,Sr,Ba,La)(Zr,Sn,Ti)$O_3$ compositions by optimizing their structures in AFE and FE phases. The derivation of $\lambda_2$ for the AFE ceramic composition is provided in the following discussion.

Applicant employed the generalized gradient approximation (GGA) for the exchange and correlation function and used the projector augmented wave (PAW) method, as implemented in the Vienna Ab-initio Simulation Package (VASP4). To design compositions, random distribution of substituted elements was done using supercell program by taking a 2×2×2 and 4×4×4 supercell (320 atoms) of antiferroelectric (AFE) orthorhombic (Pbam) and ferroelectric (FE) rhombohedral (R3m) structures of $PbZrO_3$, respectively.

A Γ-centered grid of 1×1×1 k-point was used for geometry optimization and 2×1×2 (2×2×2) k-points for the AFE (FE) phase were used for self-consistent calculations. Compositions were fully (volume and atomic positions) optimized. The convergence criterion for the relaxation and self-consistent calculations was set to $10^{-6}$ and $10^{-7}$ eV, respectively, and an energy cut-off of 460 eV for plane wave basis was used for the electronic wave functions.

To understand the geometrical compatibility and derive strain parameter, a thorough understanding of crystal structure and the relation between phases is required. The AFE $PbZrO_3$ (Pbam) is an orthorhombic structure, FE-$PbZrO_3$ is a rhombohedral (R3m) structure and cubic $PbZrO_3$ (Pm-3m) is paraelectric (PE). The transformation from PE to AFE occurs along the 110-direction of the cubic structure and the relation between cubic and orthorhombic structures is $a_O=\sqrt{2}a_C$, $b_O=2\sqrt{2}a_C$, $c_O=2a_C$, where $a_C$ is the lattice parameter of cubic and $a_O$, $b_O$, $c_O$ are the lattice parameters of the orthorhombic phase. According to the Bain model, invariant line or lattice matching should be $[110]_C\|[010]_O$, and the ratio of $b_O/a_C$-110 should be equal or close to 1 for low-strained interfaces. Similarly, FE-rhombohedral structure with $a_R=b_R=c_R$ and α=γ=Y~89.23° has a relation with AFE phases as $a_R=((\sqrt{1+2\cos\theta})a_O)/\sqrt{2}$, $b_R((\sqrt{1+2\cos\theta})a_O)/2\sqrt{2}$ and $c_R=((\sqrt{1+2\cos\theta})a_O)/2$. The derivation of these values is discussed in the following paragraphs.

The orthorhombic AFE phase emerges along the 110 directions of the cubic PE phase. Solid mechanical equations are usually formulated by tracking a certain volume of material as it translates, rotates, and deforms. This is called a Lagrangian formulation, as opposed to the Eulerian formulation commonly adopted in many other fields of physics, such as fluid flow analysis. The basis of the Eulerian formulation revolves around the flux in and out of a control volume that is fixed in space.

The cubic to orthorhombic transformation matrix (also called stretch/strain matrixes) has six variants:

$$U_1=\begin{vmatrix}\lambda_2 & 0 & 0\\ 0 & \frac{\lambda_1+\lambda_3}{2} & -\frac{\lambda_1-\lambda_3}{2}\\ 0 & -\frac{\lambda_1-\lambda_3}{2} & \frac{\lambda_1+\lambda_3}{2}\end{vmatrix},$$

$$U_2=\begin{vmatrix}\frac{\lambda_1+\lambda_3}{2} & 0 & -\frac{\lambda_1-\lambda_3}{2}\\ 0 & \lambda_2 & 0\\ -\frac{\lambda_1-\lambda_3}{2} & 0 & \frac{\lambda_1+\lambda_3}{2}\end{vmatrix},\ U_3=\begin{vmatrix}\frac{\lambda_1+\lambda_3}{2} & -\frac{\lambda_1-\lambda_3}{2} & 0\\ -\frac{\lambda_1-\lambda_3}{2} & \frac{\lambda_1+\lambda_3}{2} & 0\\ 0 & 0 & \lambda_2\end{vmatrix},$$

$$U_4=\begin{vmatrix}\lambda_2 & 0 & 0\\ 0 & \frac{\lambda_1+\lambda_3}{2} & \frac{\lambda_1-\lambda_3}{2}\\ 0 & \frac{\lambda_1-\lambda_3}{2} & \frac{\lambda_1+\lambda_3}{2}\end{vmatrix},$$

$$U_5=\begin{vmatrix}\frac{\lambda_1+\lambda_3}{2} & 0 & \frac{\lambda_1-\lambda_3}{2}\\ 0 & \lambda_2 & 0\\ \frac{\lambda_1-\lambda_3}{2} & 0 & \frac{\lambda_1+\lambda_3}{2}\end{vmatrix},\ U_6=\begin{vmatrix}\frac{\lambda_1+\lambda_3}{2} & \frac{\lambda_1-\lambda_3}{2} & 0\\ \frac{\lambda_1-\lambda_3}{2} & \frac{\lambda_1+\lambda_3}{2} & 0\\ 0 & 0 & \lambda_2\end{vmatrix}$$

where, $\lambda_1=a_M/a_A$, $\lambda_2=b_M/a_A$, and $\lambda_3=c_M/a_A$. Here, $a_A$ is the lattice parameter of cubic austenite and $a_M$, $b_M$, $c_M$ are lattice parameters of orthorhombic martensite. $\lambda_1$, $\lambda_2$, and $\lambda_3$ are the eigenvalues of the stretch matrices.

These “lattice rearrangement” matrices ($r'=\hat{A}r$) can be written as $\hat{A}=\hat{R}\hat{F}$, where $\hat{A}$ is a homogeneous distortion that is a product of R (a unitary rotation matrix, with $\hat{R}+\hat{R}$ I) and $\hat{F}$ (a Hermitian matrix defining the deformation, e.g., extensions or contractions), which has $\lambda_1$, $\lambda_2$, $\lambda_3$ as its eigenvalues and $e_1$, $e_2$, $e_3$ as its eigenvectors. The deformation matrix in bilinear form is $$F_{ij} = \lambda_1 e_1^i e_1^j + \lambda_2 e_2^i e_2^j + \lambda_3 e_3^i e_3^j.$$

If A is known, $\hat{A}+\hat{A}=\hat{F}+\hat{F}=\hat{F}^2$, due to the properties of the matrices involved. As such, $$\hat{F}^2 = \lambda_1^2 e_1^i e_1^j + \lambda_2^2 e_2^i e_2^j + \lambda_3^2 e_3^i e_3^j$$

and $$\hat{F}^{-1} = \frac{1}{\lambda_1} e_1^i e_1^j + \frac{1}{\lambda_2} e_2^i e_2^j + \frac{1}{\lambda_3} e_3^i e_3^j.$$

The deformation F should have positive eigenvalues in that negative values make no physical sense as the crystal lattice vectors would have to change direction upon deformation. If $C\equiv\hat{A}+\hat{A}=\hat{F}+\hat{F}=\hat{F}^2$, this is known as the Cauchy-Green deformation tensor. Invariants of C are used to get strain-energy-density, i.e., $$I_1 = tr(C) = \lambda_1^2 + \lambda_2^2 + \lambda_3^2,$$

$$I_2 = \frac{1}{2}\left[tr(C)^2 - tr(C^2)\right] = \lambda_1^2\lambda_2^2 + \lambda_2^2\lambda_3^2 + \lambda_3^2\lambda_1^2,$$

$$I_3 = \det(C) = \lambda_1^2\lambda_2^2\lambda_3^2.$$

Hence, to get a deformation measure based on zero, the identity tensor is subtracted from C, i.e., $$E = \frac{1}{2}(C - I).$$

When strains are small and rigid body rotations are zero, this is the engineering strain tensor, and the tr(E)=dV/V (volume strain).

Simply, the rotation matrix for a cubic to orthorhombic/tetragonal phase (it is like rotating cubic structure at a 45-degree angle which is along 110 direction) is, without a stretch necessary:

$$\hat{R} = \begin{vmatrix} +1/\sqrt{2} & 1/\sqrt{2} & 0 \\ -1/\sqrt{2} & 1/\sqrt{2} & 0 \\ 0 & 0 & 1 \end{vmatrix}$$

The antiferroelectric (AFE) $PbZrO_3$, is an orthorhombic cell of 8 f.u. which can be related with paraelectric (PE) cubic $PbZrO_3$ by rotating cubic along 110 directions with a relation:

$$a' = \sqrt{2}\,a_c,\ b' = 2\sqrt{2}\,a_c,\ \text{and}\ c = 2a_c$$

This is an ideal relation between the phases. But in real situations with respect to temperature or electric field, atoms also move, therefore, the product cell will have lattice parameters deviated from the ideally transformed cell, and that induces strain at the interfaces of the phases. This is calculated by taking a ratio of lattice parameters of the product phase (AFE-orthorhombic) to the parent phase (PE-cubic, ideally rotated along 110) cell.

Taking $a_C=b_c=c_c=4.161$ Å (experimentally derived parameters of cubic $PbZrO_3$), ideally, rotated orthorhombic cell parameters will be:

$$a' = \sqrt{2}\,a_c = 5.883128\ \text{Å},$$
$$b' = 2\sqrt{2}\,a_c = 11.7662568\ \text{Å},\ \text{and}\ c = 2a_c = 8.322\ \text{Å}$$

and experimentally observed lattice parameters of AFE orthorhombic $PbZrO_3$ are $$a_O = 5.8736\ \text{Å};\ b_O = 11.7770\ \text{Å};\ c_O = 8.1909\ \text{Å}\left(14.17\ \text{Å}^3/\text{atom}\right)\ \text{at 10 K}.$$

Then strain between the phases can be calculated using:

$$\lambda_1 = a_O/a' = 0.99838045,\ \lambda_2 = b_O/b' = 1.0009131,$$
$$\text{and}\ \lambda_3 = c_O/c' = 0.9842465 75342$$

From the crystallographic theory of martensitic transformation, there should be an undistorted interface between the martensite and the parent phase formed because of an invariant plane strain. For cubic to orthorhombic transformation, the common interface is along the b-lattice, which is why the middle eigenvalue ($\lambda_2$) is considered to check the strain between phases, and it should be 1 for the zero-strained phase according to the geometric compatibility theory.

To minimize electrical hysteresis, the lattice mismatch strain between AFE and FE phases should be minimal or close to zero. Since rhombohedral FE $PbZrO_3$ is close to cubic structure, therefore, it can be mimicked as a cubic structure for ideal rotation along 110 and comparison with orthorhombic.

Below is he direct mathematic calculation of the eigenvalue of a tensor following det|U−e·I|=0, where U is the stretch tensor, and I is the identity matrix. For the cubic to the orthorhombic case, using the stretch tensor given above, the eigenvalue can be calculated as $$\text{Det}|U-e\cdot I| = \text{Det}\begin{vmatrix} \lambda_2 - e & 0 & 0 \\ 0 & \frac{\lambda_1+\lambda_3}{2} - e & -\frac{\lambda_1-\lambda_3}{2} \\ 0 & -\frac{\lambda_1-\lambda_3}{2} & \frac{\lambda_1+\lambda_3}{2} - e \end{vmatrix} = 0$$

$$= (\lambda_2 - e)\left(\left(\frac{\lambda_1+\lambda_3}{2} - e\right)^2 - \left(\frac{\lambda_1-\lambda_3}{2}\right)^2\right) = 0$$

$$= \lambda_2\left(\frac{\lambda_1+\lambda_3}{2} - e\right)^2 - e\left(\frac{\lambda_1+\lambda_3}{2} - e\right)^2 - \lambda_2\left(\frac{\lambda_1-\lambda_3}{2}\right)^2 + e\left(\frac{\lambda_1-\lambda_3}{2}\right)^2 = 0$$

$$= e^3 - (\lambda_1+\lambda_2+\lambda_3)e^2 + (\lambda_1\lambda_2+\lambda_2\lambda_3+\lambda_1\lambda_3)e - \lambda_1\lambda_2\lambda_3 = 0.$$

So: $e_1=\lambda_1$, $e_2=\lambda_2$, $e_3=\lambda_3$

For cubic-to-rhombohedral transition, the length of the sides of cubic and trigonal unit cells are the same, the sole difference between the two lattices is the trigonal angle θ. This is very nearly the case in NiTi (the R-phase), AuCd alloys, and $TbDyFe_2$. The stretch tensors of cubic to rhombohedral transition are:

$$U_1 = \begin{pmatrix} \alpha & \beta & \beta \\ \beta & \alpha & \beta \\ \beta & \beta & \alpha \end{pmatrix}, U_2 = \begin{pmatrix} \alpha & -\beta & \beta \\ -\beta & \alpha & -\beta \\ \beta & -\beta & \alpha \end{pmatrix},$$

$$U_3 = \begin{pmatrix} \alpha & \beta & -\beta \\ \beta & \alpha & -\beta \\ -\beta & -\beta & \alpha \end{pmatrix}, U_4 = \begin{pmatrix} \alpha & -\beta & -\beta \\ -\beta & \alpha & \beta \\ -\beta & \beta & \alpha \end{pmatrix},$$

where $\alpha = \left(\sqrt{1+2\cos\theta} + 2\sqrt{1-\cos\theta}\right)/3$ and $\beta = \left(\sqrt{1+2cos\theta} - \sqrt{1-\cos\theta}\right)/3$ Therefore, with variant $U_1$, $a_R=U_1\times a_C$ $$\begin{bmatrix} a_R \\ b_R \\ c_R \end{bmatrix} = \begin{bmatrix} \alpha & \beta & \beta \\ \beta & \alpha & \beta \\ \beta & \beta & \alpha \end{bmatrix}\begin{bmatrix} a_C \\ b_C \\ c_C \end{bmatrix}$$

Since $a_C=b_C=c_C$ $$a_R = (\alpha + 2\beta)a_C$$

$$a_R = b_R = c_R = \left(\sqrt{1+2\cos\theta}\right)a_C$$

Similarly, with variant $U_2$: $a_R=(\alpha-2\beta)a_C$, $b_R=c_R=\alpha a_C$; with variants $U_3$: $\alpha_R=b_R=\alpha a_C$, $c_R=(\alpha-2\beta)a_C$; and with variants $U_4$: $a_R=c_R=\alpha\ a_C$, $b_R\ (\alpha-2\beta)a_C$;

where $$\alpha - 2\beta = \frac{\left[4\sqrt{1-cos\theta} - \left(\sqrt{1+2cos\theta}\right)\right]}{3}.$$

The relations between phases are summarized below:

Cubic (PE) and Orthorhombic (AFE)

$$a_O = \sqrt{2}\,a_C,\ b_O = 2\sqrt{2}\,a_C,\ \text{and}\ c_O = 2a_C \tag{1}$$

Cubic (PE) and Rhombohedral (FE)

$$a_R = b_R = c_R = \left(\sqrt{1+2\cos\theta}\right)a_C\ \text{(with } U_1 \text{ variant)} \tag{2}$$

FE and AFE $$a_O = \frac{\sqrt{2}\,a_R}{\left(\sqrt{1+2\cos\theta}\right)},\ b_O = \frac{2\sqrt{2}\,a_R}{\left(\sqrt{1+2\cos\theta}\right)},\ c_O = \frac{2a_R}{\left(\sqrt{1+2\cos\theta}\right)} \tag{3}$$

The analytical equation for calculating the middle eigenvalue for a cubic to rhombohedral transition can be calculated using the built-in function in Mathematic or MATLAB software.

Middle Eigenvalues for AFE/FE interface using equations 1, 2, and 3:

$$\lambda_1 = \frac{a_{AFE}(\text{observed/calculated})}{a_{FE}\ \text{(Rhombhohedral converted to orthorhombic using relation 3)}} = \frac{a_{AFE}}{\frac{\sqrt{2}\,a_R}{\left(\sqrt{1+2\cos\theta}\right)}} = \frac{a_{AFE}\sqrt{1+2\cos\theta}}{\sqrt{2}\,a_R}$$

$$\lambda_2 = \frac{b_{AFE}\sqrt{1+2\cos\theta}}{2\sqrt{2}\,a_R}$$

$$\lambda_3 = \frac{c_{AFE}\sqrt{1+2\cos\theta}}{2a_R}$$

Having derived $\lambda_1$, $\lambda_2$, and $\lambda_3$, the value of $|1-\lambda_2|$ was used as an indicator of the AFE/FE mismatch strain, which should approach zero for a super-compatible interface.

Figures 2B, 2C:
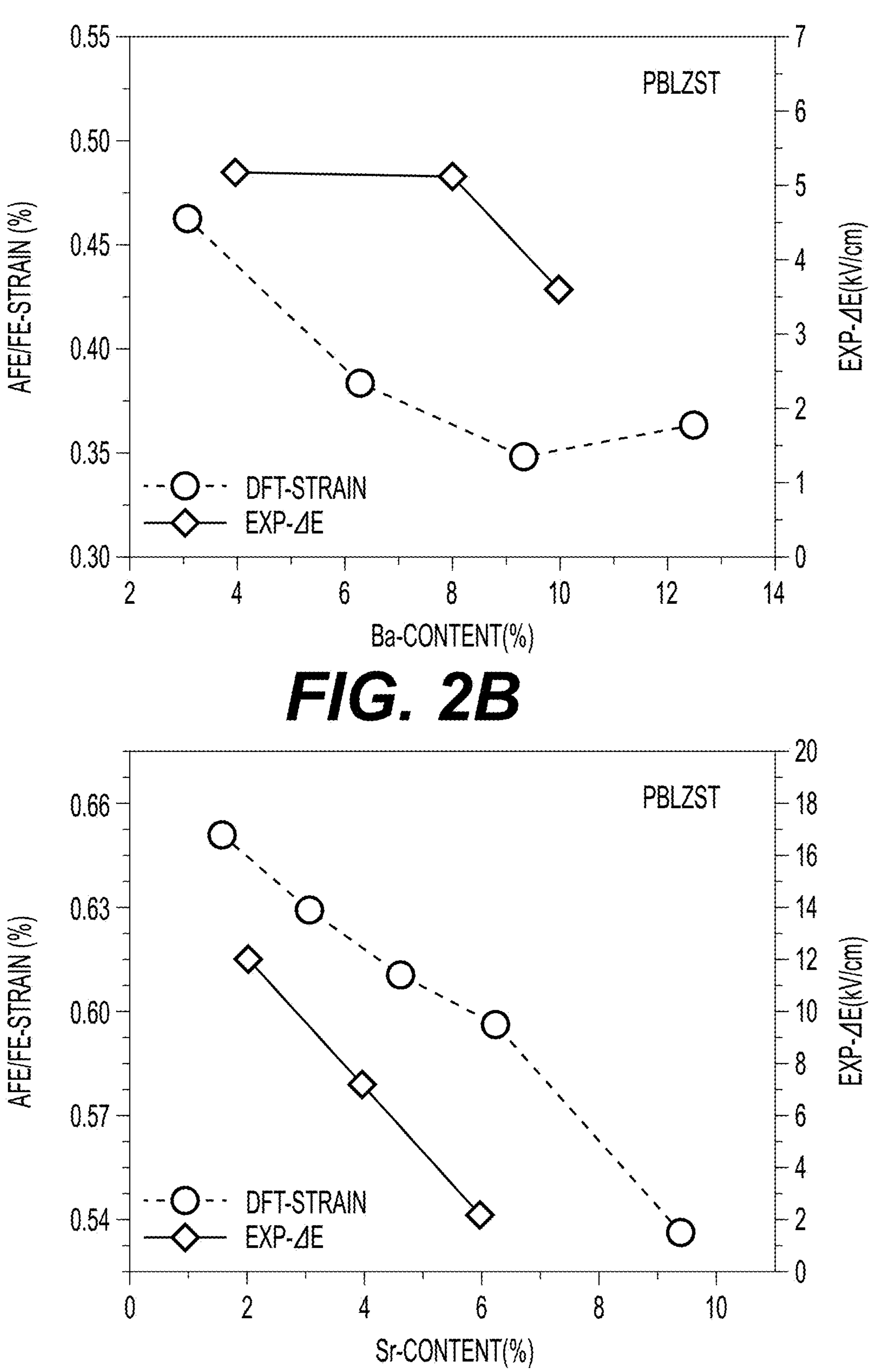
Figure 2D:
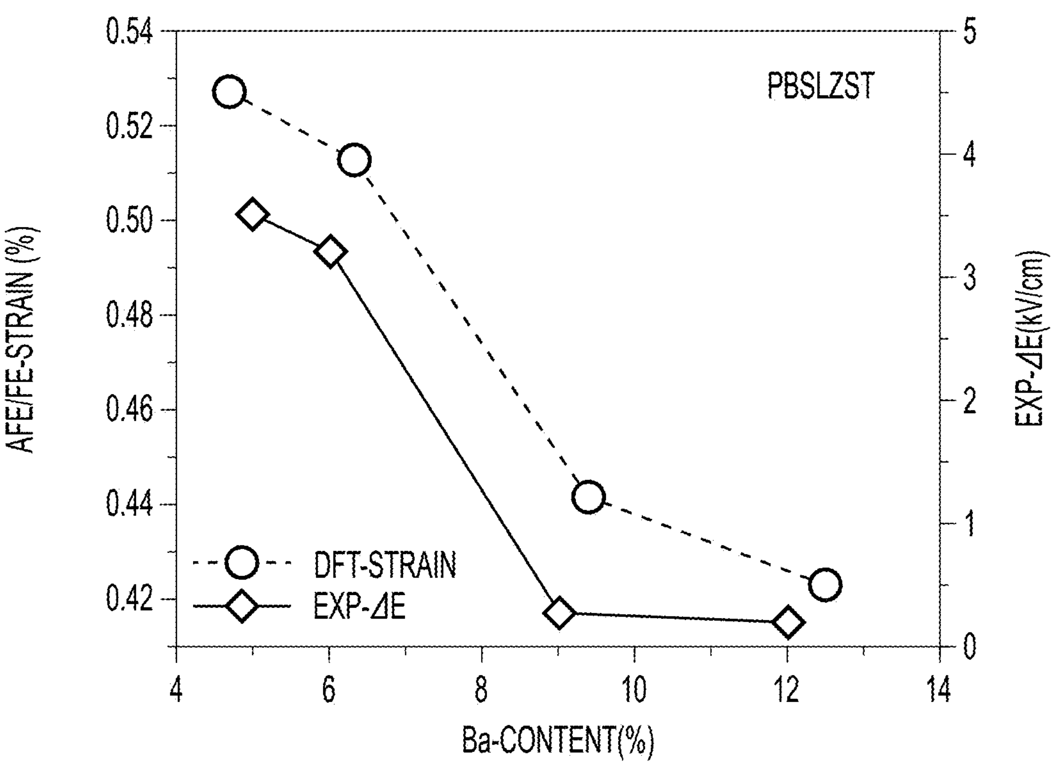

The value of $|1-\lambda_2|$ was first theoretically calculated in four composition series, each has only one varying element content. Selected compositions in these series were fabricated into ceramics and their electric hysteresis ΔE were experimentally determined. As shown in FIG. 2A, the effect of Sn content was evaluated in the $(Pb_{0.955}La_{0.03})(Zr_{0.92-x}Sn_xTi_{0.08})O_3$ system. In FIG. 2B, the effect of Ba content was evaluated in the $(Pb_{0.955}La_{0.03})(Zr_{0.92-x}Sn_xTi_{0.08})O_3$ system with y=0.6 (DFT) and 0.07 (Exp). In FIG. 2C, the effect of Sr content was evaluated in the $(Pb_{1.0-1.5w-x}Sr_xLa_w)(Zr_{0.65}Sn_zTi_y)O_3$ system with w=0.03 (DFT) and 0.02 (Exp); z=0.27 (DFT) and 0.38 (Exp); y=0.08 (DFT) and 0.10 (Exp). In FIG. 2D, the effect of Ba content was evaluated in the $(Pb_{0.935-x}Ba_xSr_{0.02}La_{0.03})(Zr_{0.68}Sn_{0.27}Ti_{0.05})O_3$ system. As shown in FIGS. 2A-2D, an excellent agreement between AFE/FE strain and ΔE was found. From this, it could be determined that a lower AFE/FE strain corresponds to a smaller ΔE.

Figure 3A:
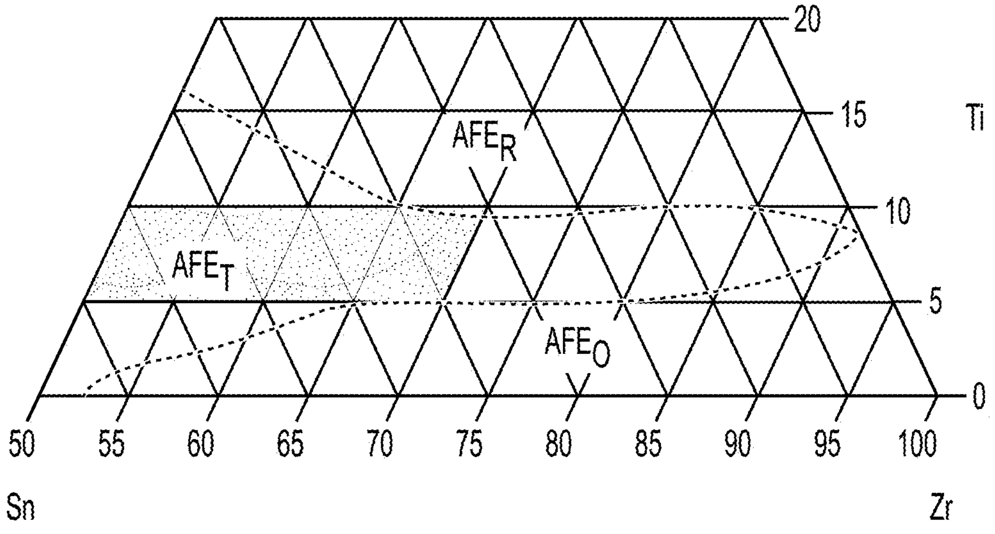
FIGS. 3A-3C provide theoretical predictions of energy-efficient AFE ceramics and their experimental validations, according to exemplary embodiments.
Figure 3B:
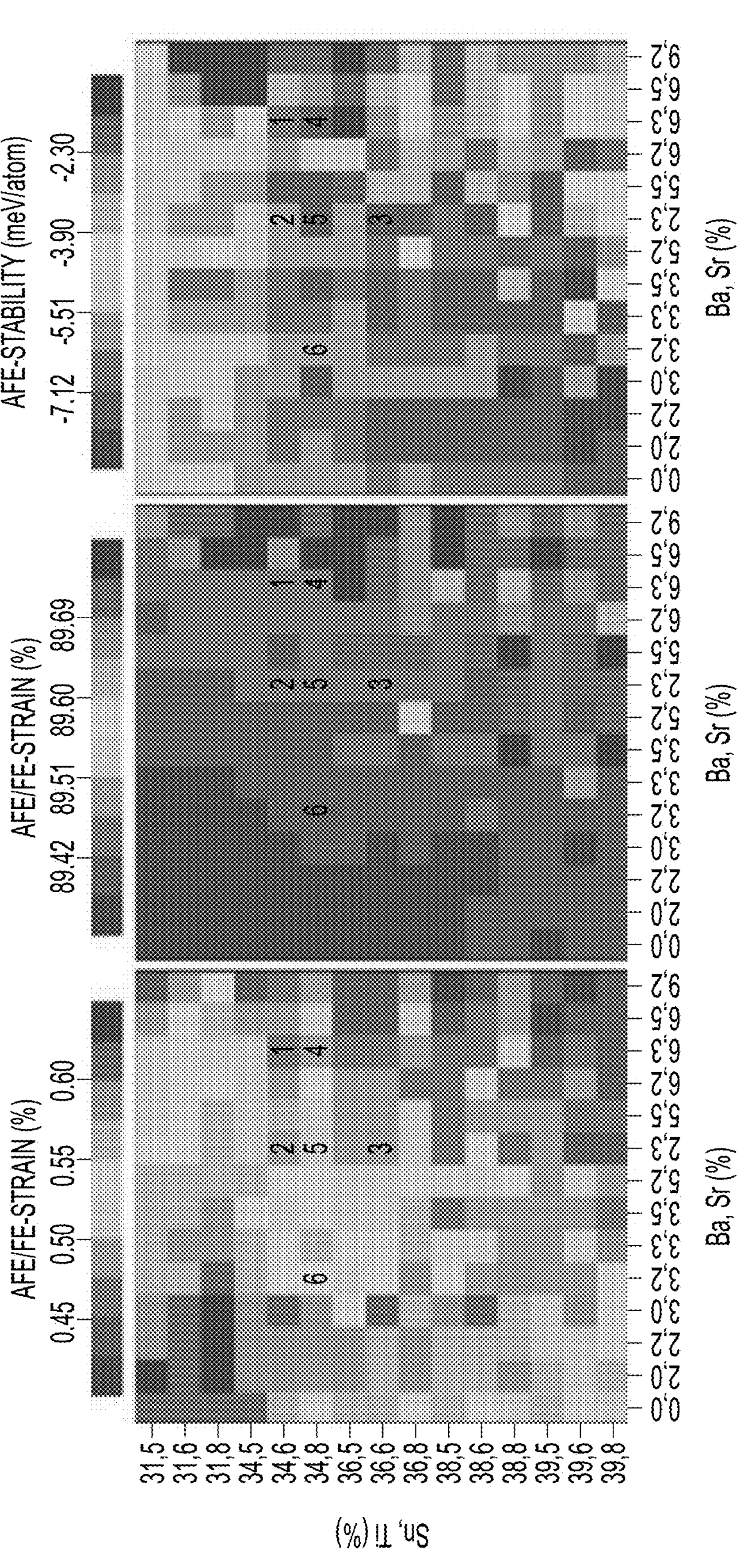

Having confirmed the relationship, high-throughput calculations were expanded to a large composition space with simultaneously varying contents of Sr, Ba, Sn, and Ti. FIG. 3A depicts the composition space of the B-site elements (Zr, Sn, Ti) investigated. In addition, Sr, Ba, and La substitution on the A-site were also included in the calculations. FIG. 3A provides the ternary phase diagram of $(Pb_{0.97}La_{0.02})(Zr,Sn,Ti)O_3$ in which orthorhombic AFE ($AFE_O$), tetragonal AFE ($AFE_T$), and rhombohedral FE ($FE_R$) phases are delineated. The shaded region represents the composition space of B-site cations in the theoretical calculations. FIG. 3B provides color heat maps (from left to right) displaying the calculated AFE/FE mismatch strain, the angle of the FE rhombohedral phase cell, and the AFE phase stability based on the energy difference between the AFE and FE phases, respectively, against varying contents of Sr and Ba on the A-site. The mappings of FIG. 3B validate that the FE-cell angle correlates well with the experimentally determined $P_{max}$ (an angle away from 90° correlates a larger $P_{max}$ as shown in the middle heat map of FIG. 3B). The energy difference between the AFE and FE phases indicates the stability of the AFE phase; hence, it is expected to reflect $E_F$ of the composition. Apparently, the FE-cell angle and AFE stability are critical factors dictating the energy density of the ceramic.

For AFE capacitors, a near-perfect q and a large $W_{rec}$ are often desired. Practically, $E_F$ needs to be high, but is limited by the dielectric breakdown strength of the ceramic. Therefore, compositions would perform best with a low AFE/FE strain, a small FE-cell angle, and a medium AFE stability from the density functional theory calculations. From the heat maps in FIG. 3B, it can be seen that these are conflicting requirements: compositions with good compatibility (high in q) are often low in both $P_{max}$ and $E_F$ (low $W_{rec}$). When considering the conflicting requirements, the best predicted compositions were obtained when setting the selection criteria to AFE/FE strain <0.54%, FE-cell angle in the range of 89.40° ~89.50°, and AFE-stability in the range of −6.0~−7.5 meV/atom.

Figure 3C:
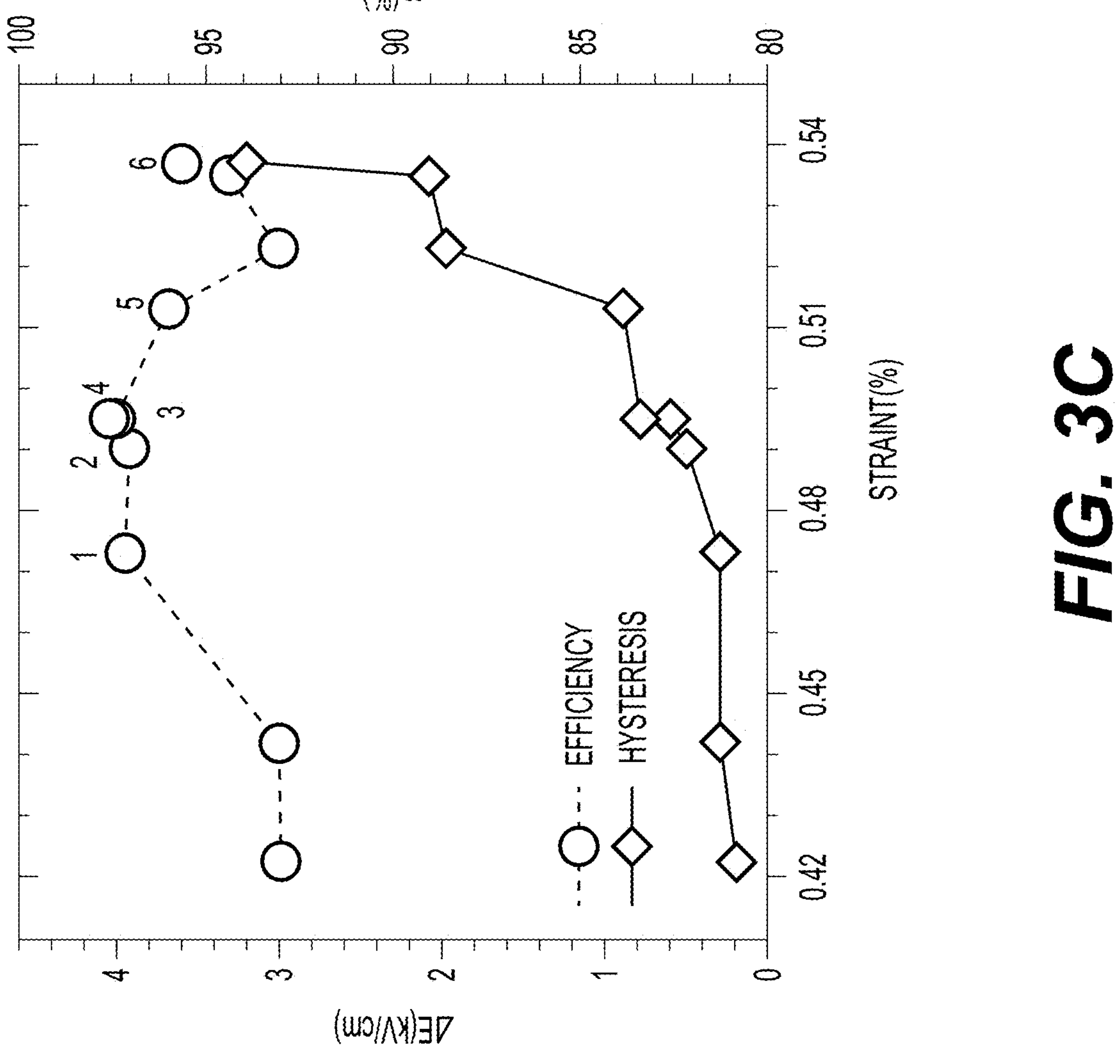

Theoretical calculations predicted 10 compositions which were all experimentally fabricated and tested. The experimental results on hysteresis ΔE and efficiency η are plotted against the theoretically calculated AFE/FE strain in FIG. 3C. In particular, FIG. 3C provides a plot of 10 compositions based on their efficiency η and their hysteresis ΔE based on the experimentally prepared samples. The correlation between AFE/FE strain and ΔE is re-affirmed, and all 10 compositions were tested to exhibit an energy efficiency η≥93.0%. In particular, compositions 1 through 5 displayed ΔE<1 kV/cm, η>96%, and $W_{rec}$≥3.0 J/cm$^3$. Two of these compositions, $(Pb_{0.875}Ba_{0.05}Sr_{0.03}La_{0.03})(Zr_{0.58}Sn_{0.36}Ti_{0.06})O_3$ (#3) and $(Pb_{0.865}Ba_{0.06}Sr_{0.03}La_{0.03})(Zr_{0.58}Sn_{0.34}Ti_{0.08})O_3$ (#4), exhibited an efficiency of 97.4% and 97.6%, respectively. Composition 6, $(Pb_{0.905}Ba_{0.03}Sr_{0.02}La_{0.03})(Zr_{0.58}Sn_{0.34}Ti_{0.08})O_3$, exhibited a slightly higher strain (0.537%) and a ΔE=3.2 kV/cm, and its efficiency was still high at 95.7%. Further, six of the compositions (labeled 1-6 in the heat maps of FIG. 3B) exhibit an efficiency η>95.0%.

The experimental validations shown in FIG. 3C and FIGS. 2A-2D demonstrate that the geometric nonlinear theory is effective and successful in guiding the discovery of AFE ceramics for energy-efficient capacitors.

Additionally, the density functional theory calculations of the low AFE/FE mismatch strain and the experimental validation of ΔE<1 kV/cm in $(Pb,Sr,Ba,La)(Zr,Sn,Ti)O_3$ compositions suggests that this solid solution with Sr and Ba co-substitutions is promising for reaching a near-perfect energy efficiency. The predicted and validated compositions were used as starting points, and the composition spread was broadened by implementing an accelerated synthesis approach, employing ΔE as a high throughput screening tool to generate a library of nearly 500 compositions.

Figure 4:
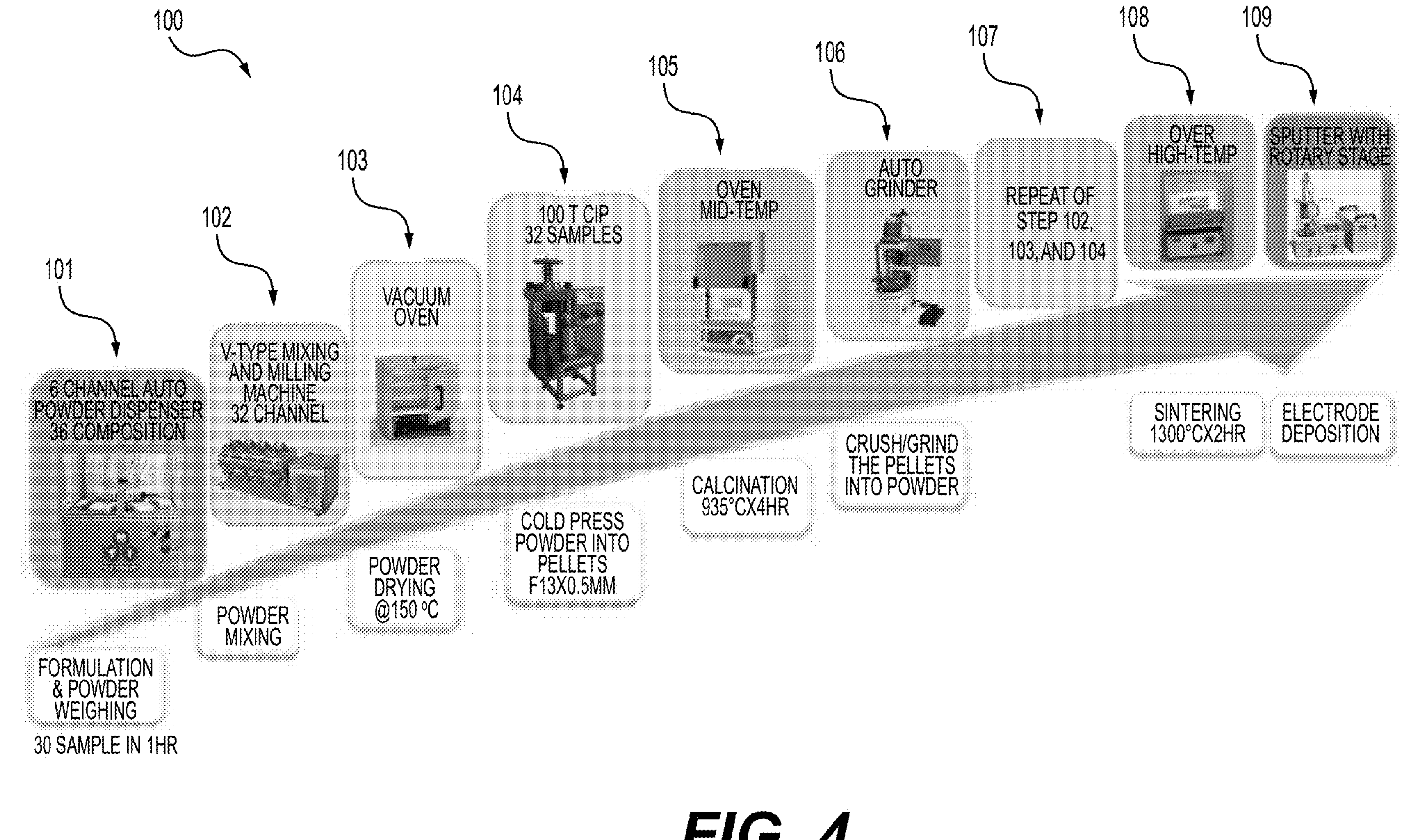
FIG. 4 is a process flow diagram for preparing samples of candidate AFE ceramic materials, according to an exemplary embodiment.

As shown in FIG. 4, the compositions were fabricated starting by preparing powder samples in a first step 101 with an auto powder dispenser. To prepare $(Pb,Sr,Ba,La)(Zr,Sn,Ti)O_3$ ceramics, the powder dispenser was loaded with PbO, $ZrO_2$, $TiO_2$, $La_2O_3$, $SnO_2$, $SrCO_3$, and $BaCO_3$ powders with purity higher than 99.9%, For the samples, the powders were weighed and mixed according to the desired chemical formula. Excess (4%) PbO was added to compensate the loss of Pb during sintering.

In a second step 102, the samples were then mixed and milled in a V-type machine. In one or more embodiments, the raw powders may be milled for, e.g., 6 hours. In a third step 103, the powder was transferred to a vacuum oven where the powder was dried at temperature in a range of 80° C. to 150° C. In a fourth step, the powder was then pressed into pellets. For the experiments conducted, the dried powder was pressed into 1-inch disks. In a fifth step 105, the pressed pellets were calcined at 935° C. for 4 hours in a medium temperature oven.

In a sixth step 106, the pellets were crushed and ground using an autogrinder to reform a powder. Steps 102, 103, and 104 (shown as seventh step 107) were repeated on the reformed powder to provide new pellets. In particular, the calcined powders were milled again for 6 hours, dried, mixed with 5 wt % PVA binder, and then pressed into pellets of 10 mm in diameter.

In an eighth step 108, the binder was burnt out of the pellets at 600° C. for 3 hours, and the pellets were sintered at 1300° C. to 1350° C. for 2 to 3 hours using a double crucible arrangement.

As depicted in FIG. 4, a 6-channel auto powder dispenser and a 32-channel mixing and milling machine were used to increase throughput of material synthesis. In addition, 18 compositions in a 2-layer arrangement were calcined and sintered in each run. The experimental setup was capable of fabricating 50 compositions per week.

In a ninth and final step 109, the sintered pellet was sputter coated with electrode material. In particular, sintered ceramic pellets were thinned and polished to the thickness of 0.2 mm to 0.25 mm. Silver films with a diameter of 4 mm were sputtered as electrodes.

Figure 5A:
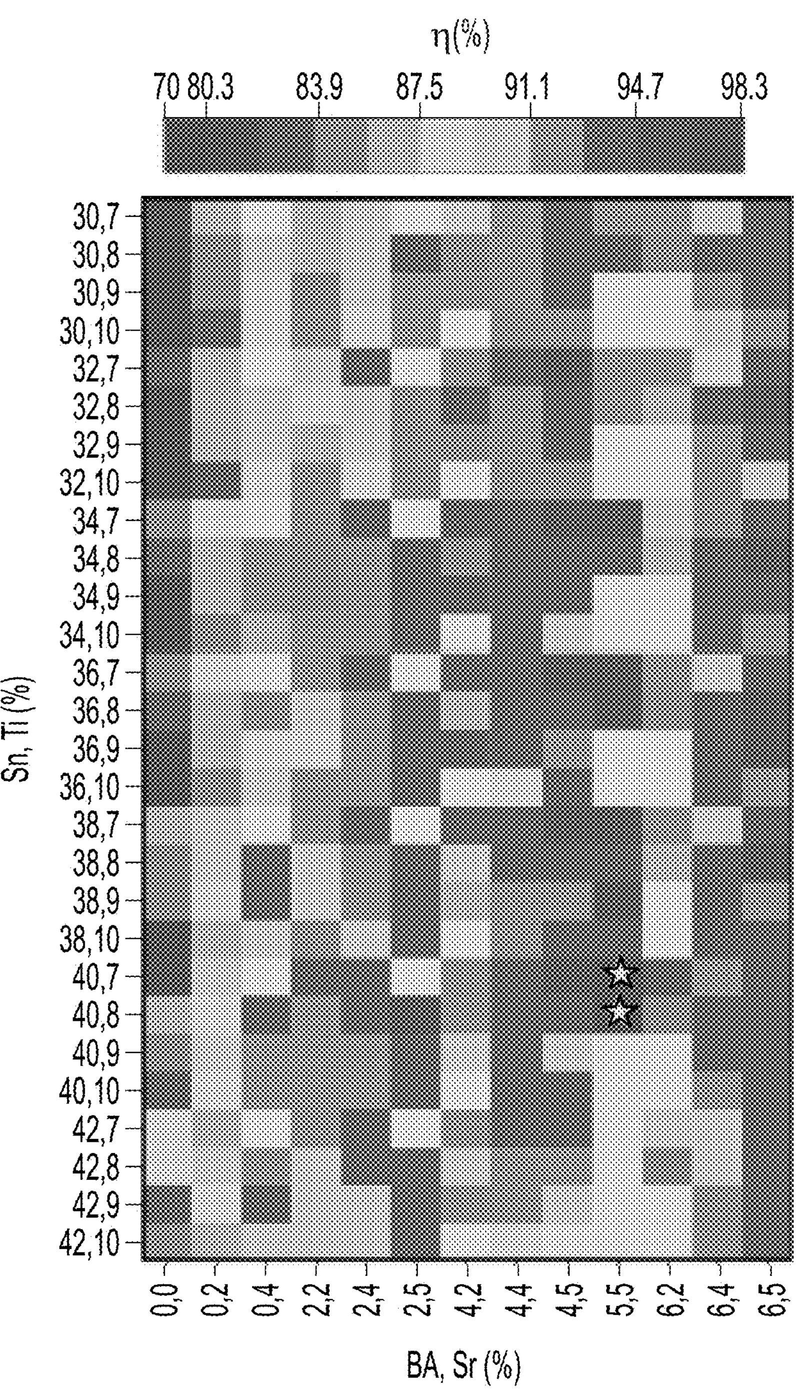
FIGS. 5A and 5B are heat maps of the combinatorial synthesis of $(Pb, Sr, Ba, La)(Zr, Sn, Ti)O_3$ ceramics based on experimentally measured charge-discharge energy efficiency (FIG. 5A) and recoverable energy density (FIG. 5B)
Figure 5B:
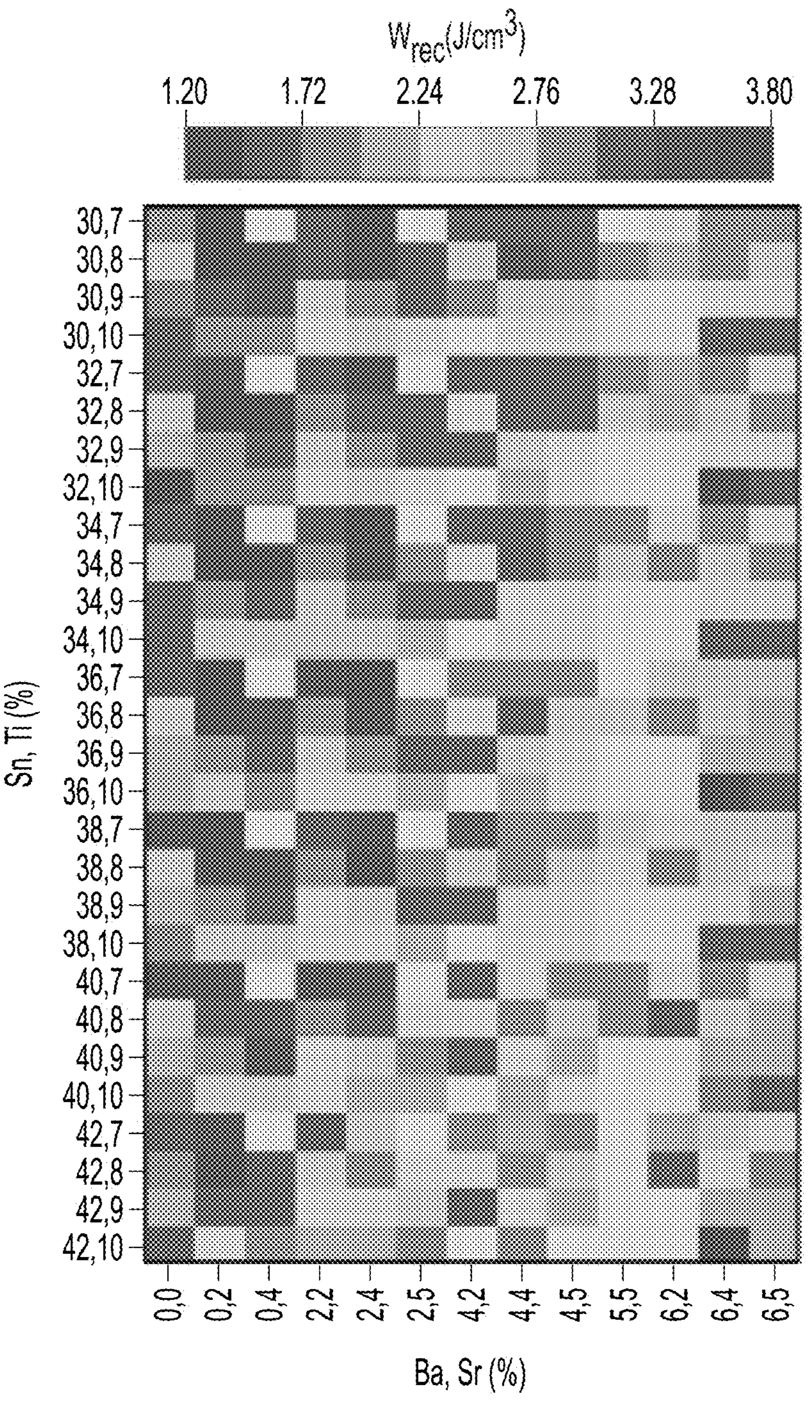

Of the compositions prepared, focus was made on the compositions in the shaded region in FIG. 3A for further measurements of η and $W_{rec}$. The results of these measurements are illustrated in the form of heat maps, shown in FIGS. 5A and 5B. Overall, the heat map of η of FIG. 5A is in agreement with that of AFE/FE strain in FIG. 3B (left graph), and the heat map of $W_{rec}$ in FIG. 5B is in agreement those of FE-cell angle and AFE stability in FIG. 3B (middle graph).

Figure 6:
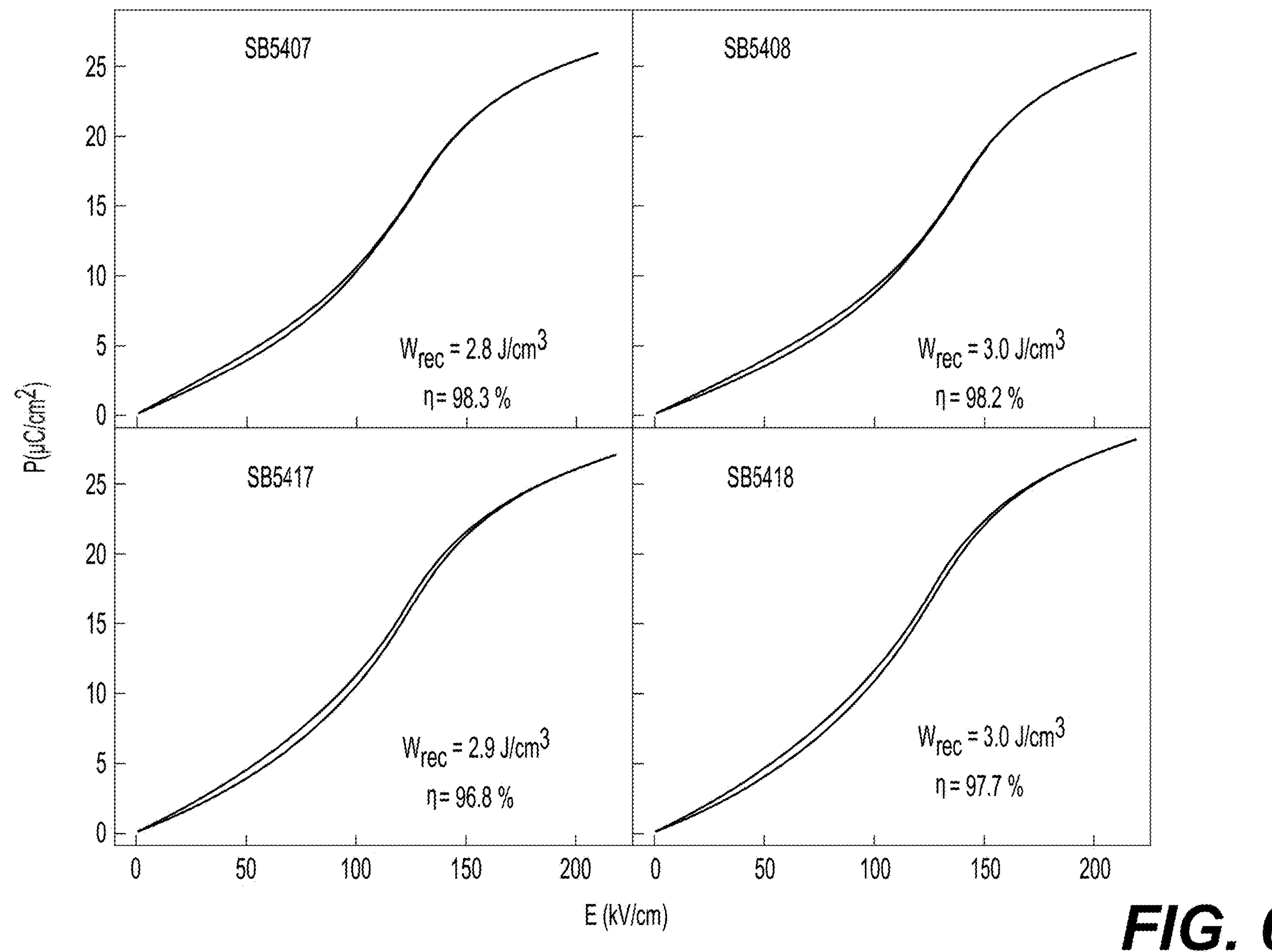
FIG. 6 provides P vs. E hysteresis loops for four $(Pb, Sr, Ba, La)(Zr, Sn, Ti)O_3$ compositions identified through combinatorial synthesis, according to exemplary embodiments.

From the prepared compositions, it was determined that Sn is beneficial to reducing ΔE and enhancing η. Increase in Ti content leads to a lower breakdown strength and a lower $E_F$ (hence, a lower $W_{rec}$); also a slight decrease in η. Substitution of Pb with Sr and Ba considerably reduces ΔE and improves η. However, their contents beyond 5 at. % lead to drop in $W_{rec}$ due to reduction in $P_{max}$ and drop in η as a result of the rise in $P_r$. Using the accelerated materials synthesis and screening of the 500 compositions, the best AFE composition designated as SB5408 is presented in a P vs. E curve of FIG. 1A and in the upper right corner of FIG. 6. In the vicinity of this composition, another 3 compositions were also discovered to have an η of 96.8%, 97.7%, and 98.3%, respectively, with a $W_{rec}$ around 3.0 J/cm$^3$, as shown in FIG. 6. This attribute is important for future large-scale materials production as composition control is not super stringent. The two best-performing compositions, SB5408 and SB5407, with η>98.0% are marked by stars in the heat map of FIG. 5A. Additionally, in FIGS. 5A and 5B, the boxes shaded in yellow represent the compositions that exhibited very poor breakdown strength.

The structural and electronic properties of SB5408 were then characterized, and the results are summarized in FIGS.

Figure 7A:
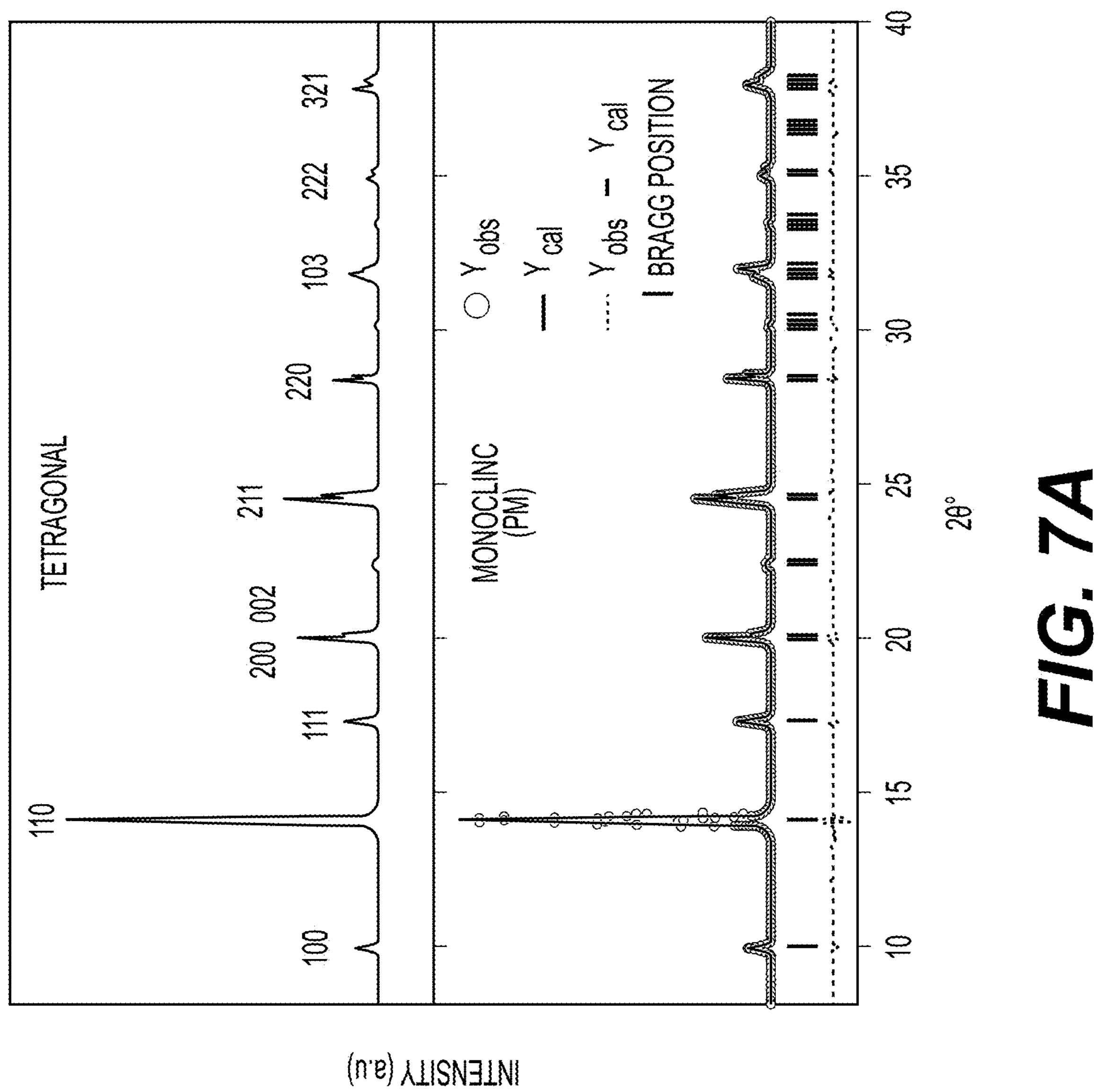
FIGS. 7A-7F provide graphs describing structural and electrical properties of an AFE ceramic, according to an embodiment of the present disclosure.

7A-7F. In particular, FIG. 7A illustrates the X-ray diffraction spectra recorded at room temperature (top panel) and at 60 K (bottom panel). The temperature dependent X-ray diffraction analysis was carried out on a Rigaku TTRAX system equipped with a theta/2 theta wide-angle goniometer and an 18-kW rotating anode X-ray source. The instrument employs Mo K$\alpha$ radiation in the Bragg-Brentano geometry, the slow scanning speed (time/step: 3 s per 0.0010) was set to clearly observe the diffraction pattern in the 2 theta range of 8-40°. Sintered pellets were crushed into powder for the measurement and Rietveld refinement was carried out with the Full Prof software package.

Figures 7B, 7C:
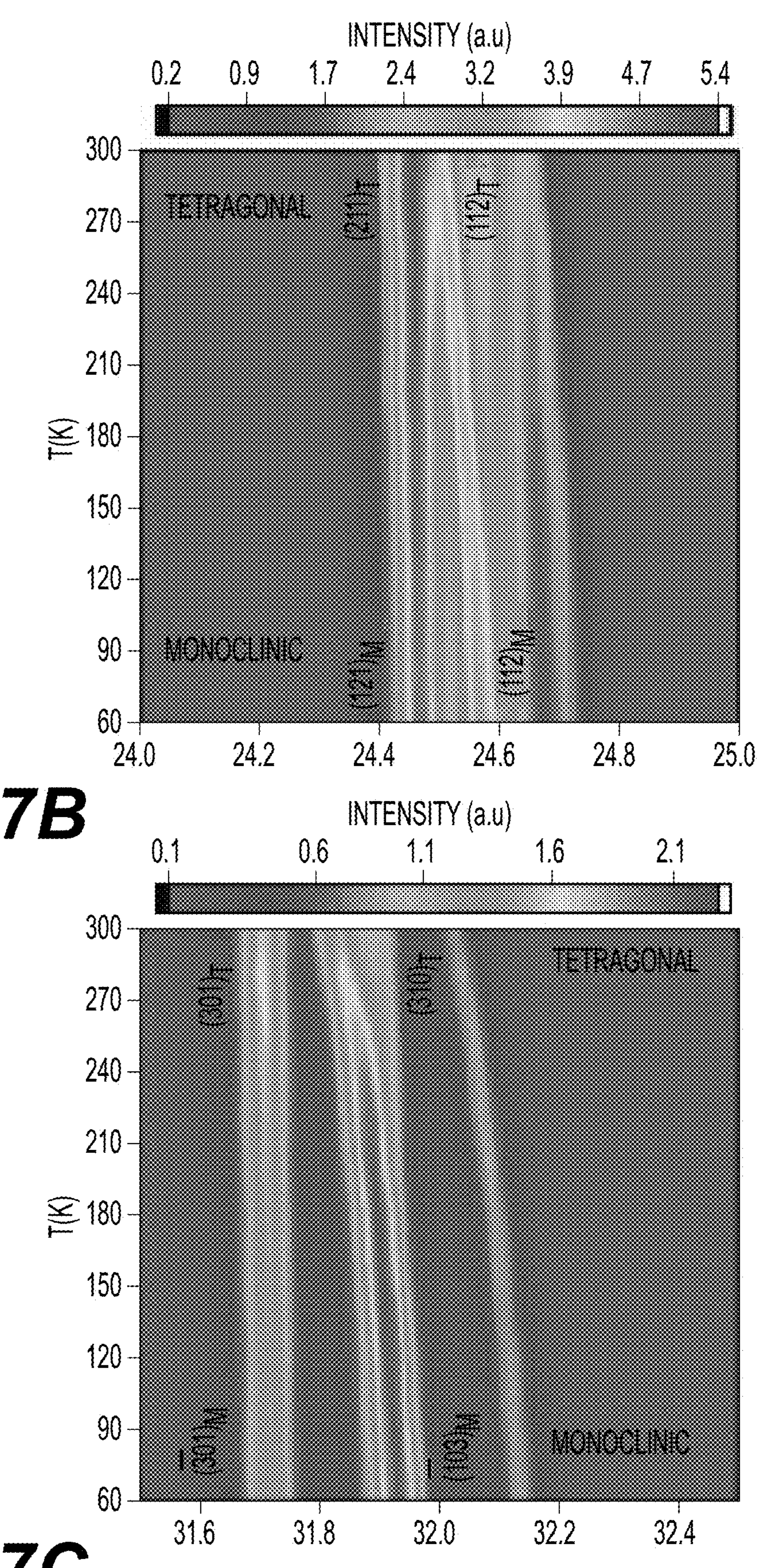

From the X-ray diffraction spectra, the room temperature structure appears to be a single-phase perovskite with tetragonal distortions, consistent with the structure of $PbZrO_3$-based AFE ceramics reported in most literature. When cooled to low temperature (60 K), the SB5408 ceramic becomes a monoclinic phase (Pm) based on the full profile refinement. The temperature-driven structural evolution of SB5408 during warming up from 60 K to room temperature is illustrated in the contour plots in FIGS. 7B and 7C. It is clear that the ceramic exists as a mixture of monoclinic and tetragonal phases over a temperature range of 180-220 K. The $(\bar{1}03)_M$ peak is observed to undergo an accelerated shift toward lower angles near 220 K, whilst the $(\bar{3}01)_M$ peak increases slightly in its intensity but does not shift in position. The intensity drop of the $(103)_T$ reflection above 240 K is a direct result of separating from K$\alpha_2$ of the $(301)_T$ reflection which coincides with the $(103)_M$ reflection. A similar trend is seen in the $(121)_M$ and $(112)_M$ peaks, which later merge into the $(211)_T$ and $(112)_T$ peaks, respectively. The line profile fitting of $(211)_T$ and $(112)_T$ peaks with Lorentzian function revealed an increase in FWHM below 180 K, which can be attributed to the presence of the monoclinic phase.

Figure 7D:
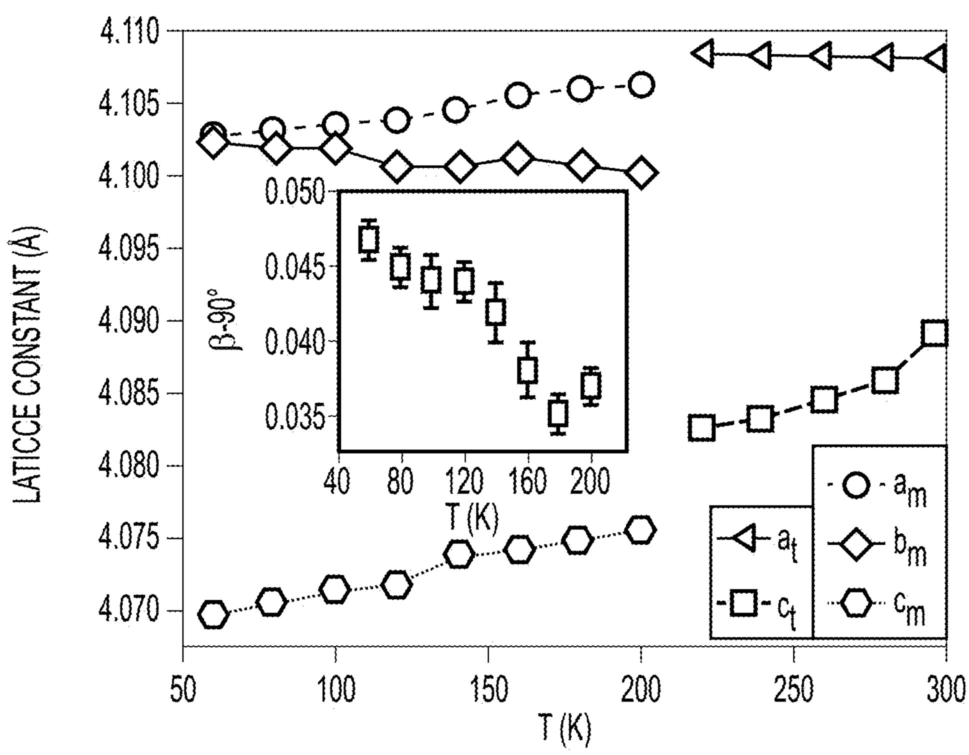
Figure 7E:
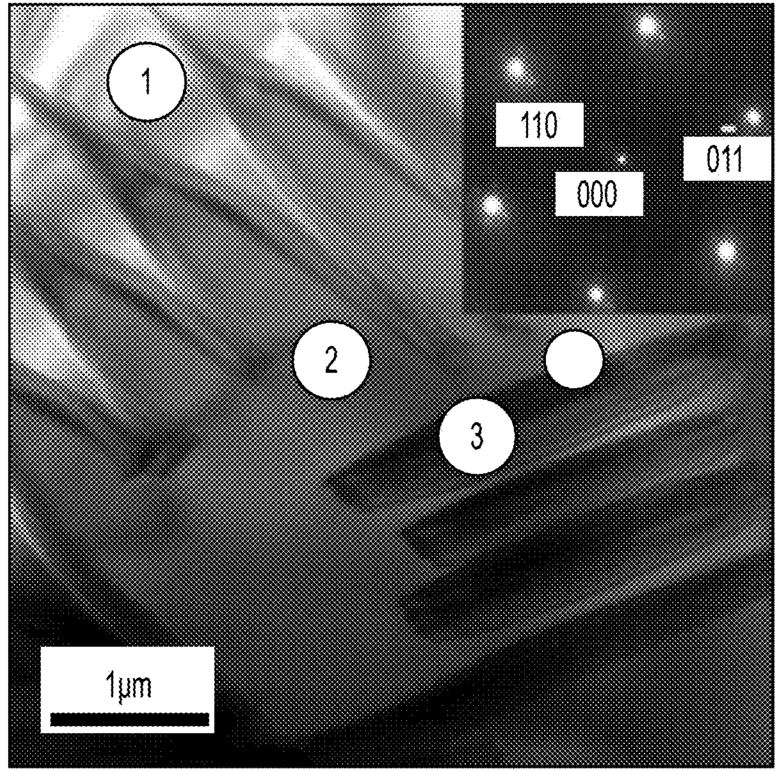

The temperature evolution of the unit cell lattice parameters, quantified from the X-ray diffraction data, is shown in FIG. 7D. The discontinuous change in lattice parameters, along with the coexistence of two phases over a temperature range, indicates the monoclinic—tetragonal phase transition in SB5408 is of first-order nature. The microstructure of the SB5408 ceramic at room temperature was analyzed with transmission electron microscopy (TEM) as shown in FIG. 7E. For the TEM analysis, specimens were prepared with procedures involving polishing, ultrasonic cutting, dimpling, and argon ion mill. To mitigate the charging effect, a thin layer of approximately 10 nm carbon was deposited onto the specimen. Bright field micrographs and select-area electron diffraction patterns were captured using the FEI Titan Themis microscope.

The bright field micrograph, recorded along the <$\bar{1}$11> zone-axis of a grain, consists of three sets of domains, labeled as 1, 2, and 3. The electron diffraction pattern shown in the inset was obtained from the circled area. There are two sets of satellite diffraction spots in the diffraction pattern, confirming the presence of incommensurate modulations in the $AFE_T$ phase of SB5408 at room temperature. As these modulations originate primarily from cation displacements, the low intensity of these satellite spots in SB5408 suggests there might be a fraction of volume contains cation displacements and at a smaller amplitude.

Figures 7F, 8A:
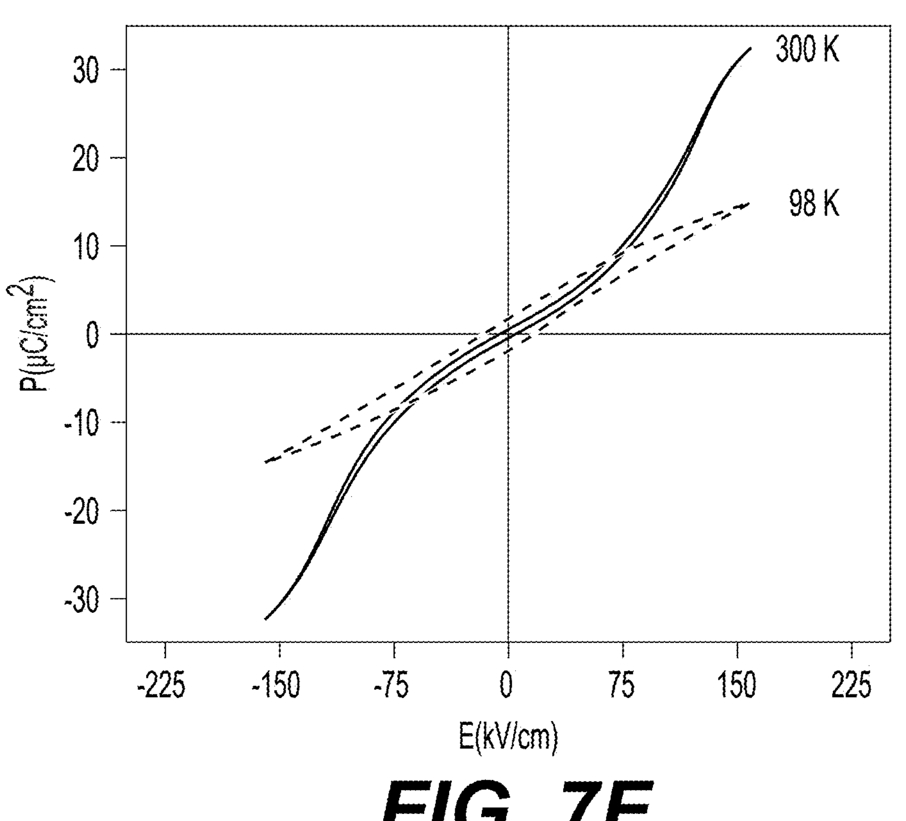
FIGS. 8A-8D provide graphs of temperature, frequency, and cycle number-dependent electrical properties of an AFE ceramic, according to an embodiment of the present disclosure.

In order to corroborate the temperature-dependent X-ray diffraction findings, P vs. E loops were measured in the temperature range of 98-300K, and the P vs. E loops for 98K and for 300K are provided in FIG. 7F. The room temperature P vs. E hysteresis loops were measured using a standardized ferroelectric test system (Precision LC II, Radiant Technologies) at a frequency of 1 Hz. For the fatigue test, Ag/Pd bilayer film electrodes with a diameter of 2 mm were used, and the test was carried out at 25 Hz at room temperature. For the low-temperature P vs. E hysteresis loop measurement, the sample was immersed in an electrical fluid and the temperature was controlled with a Delta 9023 environmental chamber. At 98K, the SB5408 ceramic displays a single slim P vs. E loop. Upon increase in temperature near 170 K, the P vs. E loop begins to convert into double hysteresis loops (not shown here), indicating the transition to the AFE phase. Hence, it appears that the low temperature monoclinic phase revealed by X-ray diffraction is a FE phase. It is plausible to speculate that the small electric hysteresis in the FE phase for polarization reversal is inherited from the near-zero $\Delta E$ in the AFE/FE phase transition.

Results from additional experimental measurements on SB5408 are displayed in FIGS. 8A-8D. FIG. 8A depicts the temperature-dependent dielectric constant during heating and cooling at 1 kHz. The dielectric constant vs. temperature measurements were conducted using a Novocontrol system at a heating/cooling rate of 1 K/min at frequencies of 0.1, 1, 10, and 100 kHz. As can be seen, the dielectric constant vs. temperature curve exhibits a broad hump around 180 K, peaks at 411 K, exhibits another hump at 478 K. According to X-ray diffraction analysis results obtained by Applicant and the phase transition sequence in previous reports on other $PbZrO_3$-based AFE ceramics, SB5408 is monoclinic FE below 180 K, tetragonal AFE between 180 and 411 K, multicell cubic paraelectric between 411 and 478 K, and single-cell cubic paraelectric above 478 K. It is interesting to note that the dielectric constant curves measured upon heating and cooling overlap each other, revealing a near-zero thermal hysteresis for the FE/AFE phase transition, even though it is a first-order transition. This is in sharp contrast to other $PbZrO_3$-based AFE ceramics with a large $\Delta E$, where a comparatively huge thermal hysteresis of 51 K was observed. The result suggests that minimized AFE/FE interfacial mismatch strain enhances the reversibility of the AFE/FE phase transition triggered by both electric field and temperature.

Figures 8B, 8C:
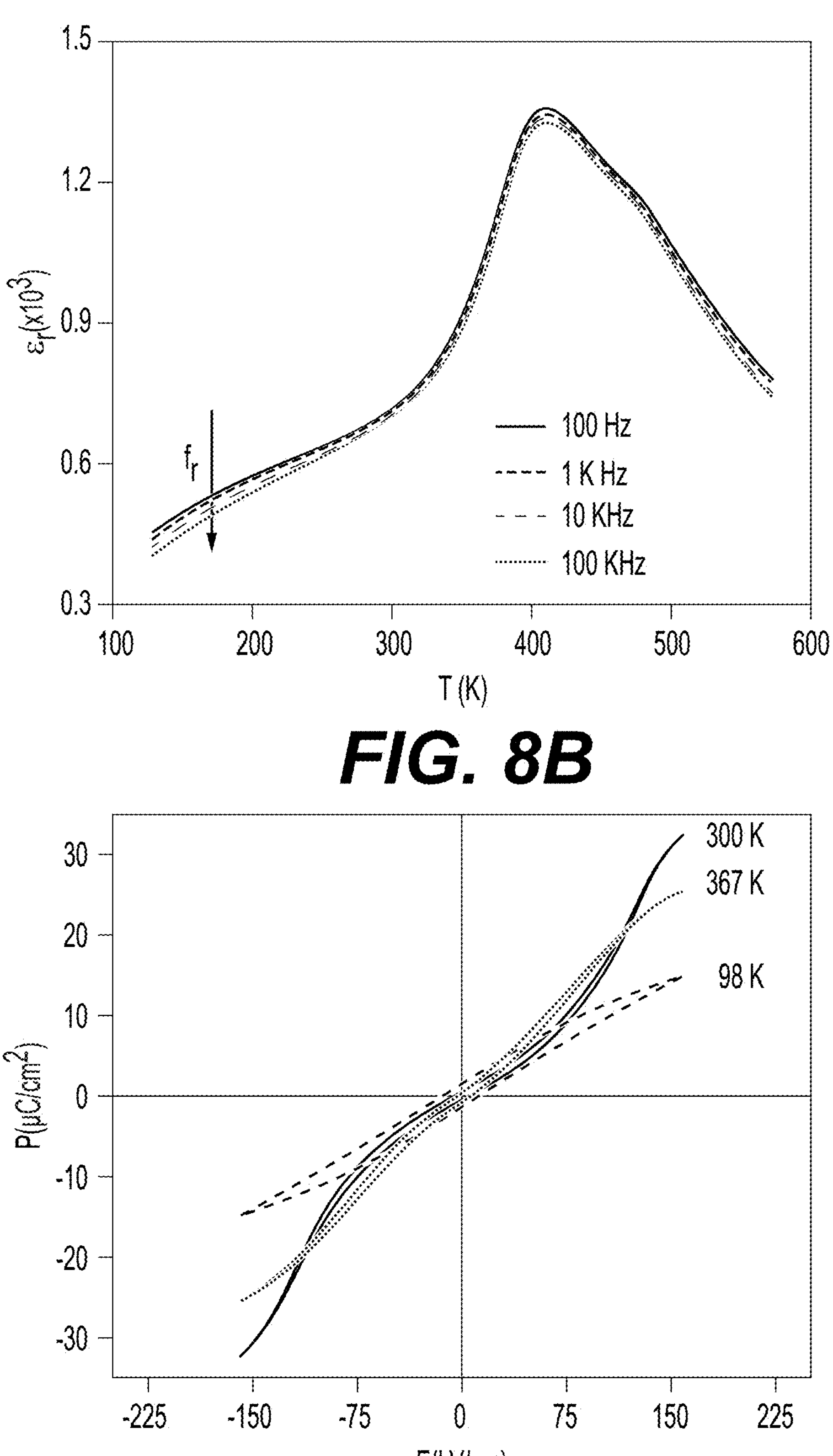
Figures 8D, 9:
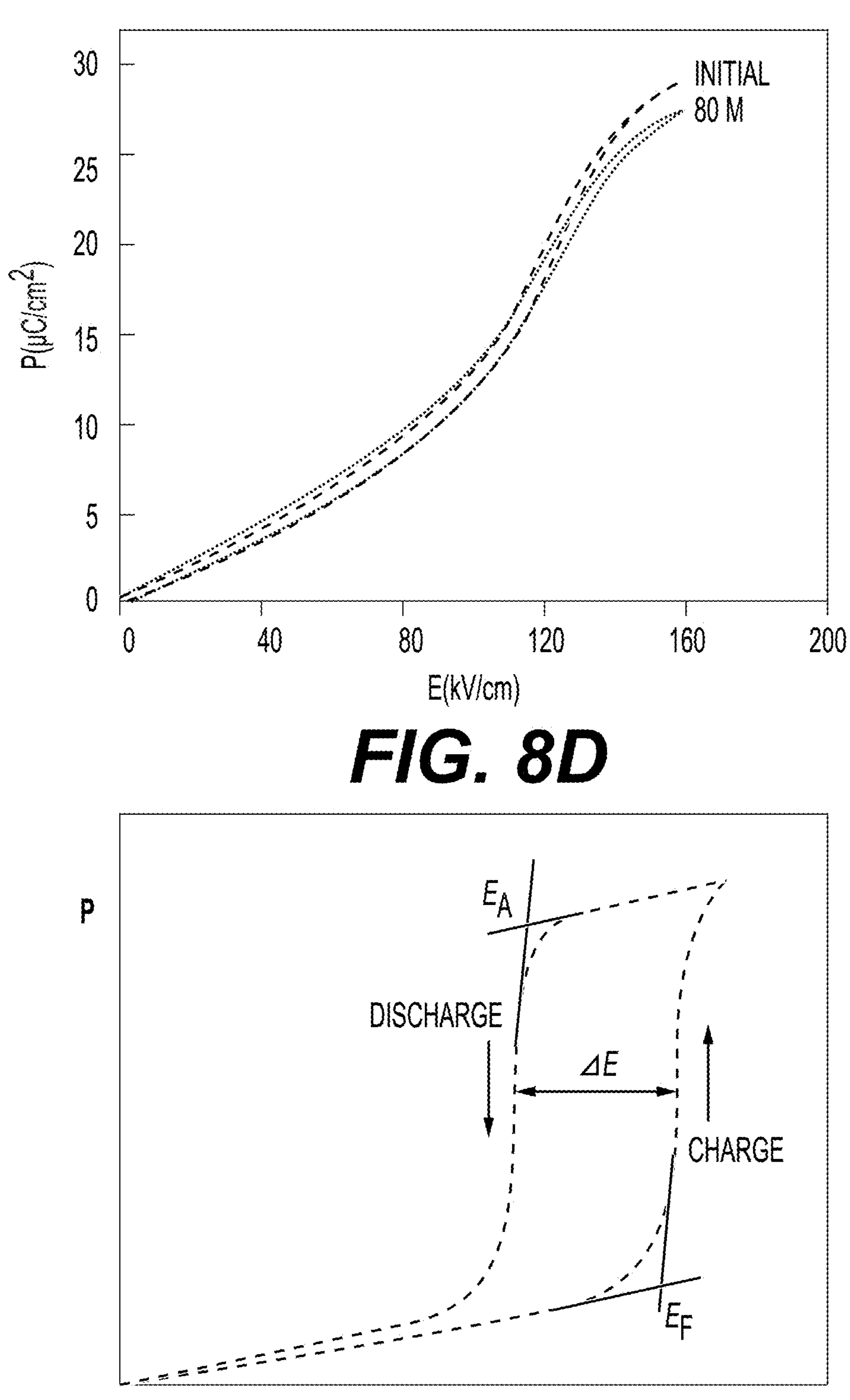
FIG. 9 is a schematic P vs. E hysteresis loop of typical AFE ceramics showing $E_F$, $E_A$, and electric hysteresis $\Delta E$.

As shown in FIG. 8B, the low-temperature monoclinic phase exhibits an apparent frequency dependence of the dielectric constant. The polarization measurement indicates P vs. E double hysteresis loops remain at least up to 367 K as shown in FIG. 8C, supporting the AFE nature between 180 and 411 K. The comparison of the P vs. E loops at initial stage and after 79.5 millions cycles (80 M) is displayed in FIG. 8D. The portion of the curves below 120 kV/cm remains unchanged, while minor degradation in $P_{max}$ is seen in the induced FE phase. In SB5408, the compatible AFE/FE interface ensures excellent reversibility of the AFE/FE phase transition, achieves record-high energy efficiency, and extends the charge-discharge lifetime.

Applicant believes that the approach to realize ultra-high energy efficiency by designing compatible AFE/FE interfaces has not yet been reported previously with respect to AFE ceramics. Instead, in the literature, a recent approach has been to introduce aliovalent cations that lead to the so-called "relaxor antiferroelectric" behavior by randomizing the local fields and disrupting long-range AFE order. For example, $Bi^{3+}$, $Zn^{2+}$, and $Nb^{5+}$, in the nominal form of $Bi(Zn_{2/3}Nb_{1/3})O_3$, were introduced to a (Pb,La)(Zr,Sn,Ti)$O_3$ AFE ceramic and an efficiency of 95.6% was achieved. By analyzing the temperature-dependent dielectric constant in the paraelectric phase of SB5408, the presently disclosed AFE ceramic is not likely to be a relaxor AFE.

The dielectric data of SB5408 is fitted with the expression, $$\frac{\varepsilon_{m,r}}{\varepsilon_r} = 1 + \frac{(T - T_m)^\gamma}{2\delta^2},$$

where $\gamma$ is the degree of dielectric relaxation, which equals to 1 for a normal AFE and 2 for an ideal relaxor AFE, $\delta$ is the degree of diffuseness of the transition, $\varepsilon_{m,r}$ is the maximum value of the dielectric constant, and $T_m$ is the temperature where the dielectric constant reaches $\varepsilon_{m,r}$. The values of $\gamma$ and $\delta$ for SB5408 are determined to be 1.14 and 13.5, respectively. In contrast, the $Bi(Zn_{2/3}Nb_{1/3})O_3$-modified $(Pb,La)(Zr,Sn,Ti)O_3$ relaxor AFE ceramic has the values of 1.65 and 51.8, respectively, much higher than those of SB5408.

The compatibility indicator, the mid-eigen value $\lambda_2$ of the AFE/FE transformation stretch tensor, was further assessed in two situations. First, the lattice parameters of the monoclinic FE phase are extrapolated to room temperature to match the lattice parameters of the tetragonal AFE phase. The $\lambda_2$ is calculated to be 0.9988. This value is very close to unity, verifying that the AFE/FE interface at room temperature is highly compatible and supporting the excellent reversibility of the electric field-induced AFE/FE transition at room temperature. Second, the lattice parameters of the tetragonal AFE phase are extrapolated to 200 K to match the lattice parameters of the monoclinic FE phase. The $\lambda_2$ is calculated to be 0.9979. This value is also close to unity, suggestion that the AFE/FE interface at 200 K is compatible. The result supports the good reversibility of the temperature induced AFE/FE transition in this temperature range.

In summary, the geometric nonlinear theory of martensitic transition is demonstrated to guide the development and synthesis of $PbZrO_3$-based antiferroelectric ceramics having the highest reported charge-discharge energy efficiency. As discussed above, density functional theory calculations were conducted to identify promising compositions with a small AFE/FE mismatch strain, a large polarization in the FE phase, and an appropriate AFE phase stability. After experimental validation, high-throughput synthesis was conducted to fabricate ceramics with compositions in the vicinity of the best compositions. Then, electrical property screening led to the identification of four compositions with near-perfect energy efficiency (~98%). These ceramics exhibit a recoverable energy density of ~3.0 J/cm$^3$ at an applied field of ~220 kV/cm. Most importantly, the fatigue life of the AFE capacitor reaches 80 million charge-discharge cycles, which is an 80 times enhancement over AFE ceramics with large electric hysteresis. The disclosed methodology can be applied to the discovery of other functional ceramics, such as Pb-free AFE ceramics (e.g., $AgNbO_3$ and $NaNbO_3$) with ultrahigh energy efficiency.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. An antiferroelectric (AFE) ceramic, comprising:

a $PbZrO_3$-based composition;

wherein the AFE ceramic comprises a charge-discharge energy efficiency of at least 96%;

wherein the AFE ceramic comprises a recoverable energy density of at least 2.8 J/cm at a peak field of at least 200 kV/cm;

wherein the $PbZrO_3$-based composition has the formula of $[Pb_{(1-x-y-1.5z)}Sr_xBa_yLa_z][Zr_{(1-u-v)}Sn_uTi_v]O_3$; and wherein x is in a range from 0.02 to 0.06.

2. The AFE ceramic of claim 1, wherein y is in a range from 0.02 to 0.06.

3. The AFE ceramic of claim 1, wherein z is in a range from 0.02 to 0.03.

4. The AFE ceramic of claim 1, wherein u is in a range from 0.20 to 0.45.

5. The AFE ceramic of claim 1, wherein v is in a range from 0.04 to 0.10.

6. The AFE ceramic of claim 1, wherein the AFE ceramic exhibits a reduction in maximum polarization of 6% or less after $7.95\times10^7$ charge-discharge cycles.

7. An antiferroelectric (AFE) ceramic, comprising:

a $PbZrO_3$-based composition;

wherein the AFE ceramic comprises a charge-discharge energy efficiency of at least 96%;

wherein the AFE ceramic comprises a recoverable energy density of at least 2.8 J/cm$^3$ at a peak field of at least 200 kV/cm; and wherein the formula of the $PbZrO_3$-based composition is $(Pb_{0.87}Sr_{0.05}Ba_{0.05}La_{0.02})(Zr_{0.53}Sn_{0.40}Ti_{0.07})O_3$.

8. The AFE ceramic of claim 7, wherein the charge-discharge energy efficiency is at least 98%.

9. An antiferroelectric (AFE) ceramic, comprising:

a $PbZrO_3$-based composition;

wherein the AFE ceramic comprises a charge-discharge energy efficiency of at least 96%;

wherein the AFE ceramic comprises a recoverable energy density of at least 2.8 $J/cm^3$ at a peak field of at least 200 kV/cm; and wherein the formula of the $PbZrO_3$-based composition is $(Pb_{0.87}Sr_{0.05}Ba_{0.05}La_{0.02})(Zr_{0.52}Sn_{0.40}Ti_{0.08})O_3$.

10. The AFE ceramic of claim 9, wherein the recoverable energy density is at least 3.0 $J/cm^3$.

11. An antiferroelectric (AFE) ceramic, comprising:

a $PbZrO_3$-based composition;

wherein the AFE ceramic comprises a charge-discharge energy efficiency of at least 96%;

wherein the AFE ceramic comprises a recoverable energy density of at least 2.8 $J/cm^3$ at a peak field of at least 200 kV/cm; and wherein the formula of the $PbZrO_3$-based composition is $(Pb_{0.87}Sr_{0.05}Ba_{0.05}La_{0.02})(Zr_{0.51}Sn_{0.41}Ti_{0.08})O_3$.

12. An antiferroelectric (AFE) ceramic, comprising:

a $PbZrO_3$-based composition;

wherein the AFE ceramic comprises a charge-discharge energy efficiency of at least 96%;

wherein the AFE ceramic comprises a recoverable energy density of at least 2.8 $J/cm^3$ at a peak field of at least 200 kV/cm; and wherein the formula of the $PbZrO_3$-based composition is $(Pb_{0.87}Sr_{0.05}Ba_{0.05}La_{0.02})(Zr_{0.52}Sn_{0.41}Ti_{0.07})O_3$.

13. A method of synthesizing antiferroelectric (AFE) ceramics having a charge-discharge energy efficiency of at least 96%, the method comprising:

conducting density functional theory calculations on AFE base compositions to identify at least one potential composition based on mismatch strains between AFE phases and ferroelectric (FE) phases, a FE cell angle; and AFE phase stability;

preparing a plurality of samples having compositions that vary by at least 0.1 at % and no more than 3.0 at % of at least one element relative to the at least one potential composition;

measuring the recoverable energy density and charge-discharge efficiency of the plurality of samples;

selecting compositions for which the charge-discharge efficiency is at least 96% and the recoverable energy density is at least 2.8 $J/cm^3$ at a peak field of at least 200 kV/cm; and synthesizing the selected compositions using solid-state reactions.

14. The method of claim 13, wherein preparing the plurality of samples further comprises preparing powder mixtures using a multi-channel auto-powder dispenser, mixing and milling the powder mixtures in a multi-channel milling machine, drying the powder in a vacuum oven, pressing the powder into pellets, calcining the pellets, grinding the pellets back into a powder, re-mixing the powder, re-drying the powder in the vacuum oven, re-pressing the powder back into pellets, and sintering the pellets.

15. The method of claim 14, wherein the AFE base composition is $PbZrO_3$.

16. The method of claim 15, wherein preparing powder mixtures further comprises adding 4 wt % excess PbO.

17. The method of claim 15, wherein the pellets are sintered at 1300° C. to 1350° C. for 2 hours to 3 hours.

* * * * *